(12) United States Patent
Horn et al.

(10) Patent No.: US 9,480,092 B2
(45) Date of Patent: Oct. 25, 2016

(54) ESTABLISHING PACKET DATA NETWORK CONNECTIVITY FOR LOCAL INTERNET PROTOCOL ACCESS TRAFFIC

(75) Inventors: Gavin Bernard Horn, La Jolla, CA (US); Gerardo Giaretta, San Diego, CA (US); Parag Arun Agashe, San Diego, CA (US); Fatih Ulupinar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1054 days.

(21) Appl. No.: 12/728,778

(22) Filed: Mar. 22, 2010

(65) Prior Publication Data

US 2010/0272013 A1    Oct. 28, 2010

Related U.S. Application Data

(60) Provisional application No. 61/172,198, filed on Apr. 23, 2009, provisional application No. 61/176,649, filed on May 8, 2009.

(51) Int. Cl.
 *H04W 76/02* (2009.01)
 *H04W 8/08* (2009.01)
 (Continued)

(52) U.S. Cl.
 CPC ........... *H04W 76/022* (2013.01); *H04W 8/082* (2013.01); *H04W 48/17* (2013.01); *H04W 76/021* (2013.01); *H04W 84/045* (2013.01)

(58) Field of Classification Search
 CPC .................................................. H04W 76/02
 USPC ......................................................... 370/230
 See application file for complete search history.

(56) References Cited

U.S. PATENT DOCUMENTS

2002/0006780 A1* 1/2002 Bjelland et al. .............. 455/406

2003/0048804 A1* 3/2003 Inouchi et al. ............... 370/466
(Continued)

FOREIGN PATENT DOCUMENTS

| CN | 1677981 A | 10/2005 |
|---|---|---|
| CN | 101369912 A | 2/2009 |

(Continued)

OTHER PUBLICATIONS

3rd Generation Partnership Project; 38-50 Technical Specification Group Services and System Aspects; General Packet Radio Service (GPRS) enhancements for Evolved Universal Terrestrial Radio Access Network (E-UTRAN) access (Release 8) 3GPP Standard; 3GPP TS 23.401, 3rd Generation Partnership Project (3GPP), Mobile Competence Centre ; 650, Route Des Lucioles ; F-06921 Sophia-Antipolis Cedex ; France, No. V8.4.1, Dec. 1, 2008, pp. 1-219, XP050363627.

(Continued)

*Primary Examiner* — Hassan Kizou
*Assistant Examiner* — Ashil Farahmand
(74) *Attorney, Agent, or Firm* — François A. Pelaez

(57) ABSTRACT

Providing for establishment of local Internet Protocol access (LIPA) for cellular communication is provided herein. According to particular aspects of the subject disclosure, provided are mechanisms to identify a request to establish a packet network connection as a request for a LIPA context. Once identified, a local gateway associated with the UE or with a subscriber-deployed base station is identified, and a packet context is established to support LIPA traffic for the UE. Additional mechanisms support UE mobility from one base station to another, including identifying and terminating inactive LIPA contexts. Further, a UE is described that can recognize and facilitate the establishment of a LIPA context for applications executing at the UE.

19 Claims, 17 Drawing Sheets

(51) Int. Cl.
H04W 48/00 (2009.01)
H04W 84/04 (2009.01)

(56) References Cited

U.S. PATENT DOCUMENTS

| | | | | |
|---|---|---|---|---|
| 2003/0055954 | A1* | 3/2003 | Kavanagh | 709/224 |
| 2004/0203801 | A1* | 10/2004 | Chitrapu | 455/445 |
| 2005/0220144 | A1* | 10/2005 | Ishiyama et al. | 370/471 |
| 2008/0285492 | A1* | 11/2008 | Vesterinen | 370/310 |
| 2009/0047947 | A1 | 2/2009 | Giaretta et al. | |
| 2010/0054222 | A1* | 3/2010 | Rune | 370/338 |
| 2010/0202351 | A1* | 8/2010 | Xi et al. | 370/328 |

FOREIGN PATENT DOCUMENTS

| | | |
|---|---|---|
| EP | 1772990 A1 | 4/2007 |
| JP | H11113058 A | 4/1999 |
| JP | 2010539758 A | 12/2010 |
| RU | 2273104 | 3/2006 |
| RU | 2349045 C2 | 3/2009 |
| WO | 03032604 A1 | 4/2003 |
| WO | 2008060208 A1 | 5/2008 |
| WO | 2008125729 A1 | 10/2008 |
| WO | 2008132163 A1 | 11/2008 |
| WO | 2009018533 | 2/2009 |
| WO | 2009036690 A1 | 3/2009 |

OTHER PUBLICATIONS

3rd Generation Partnership Project; Technical Specification Group Core Network and Terminals; 3GPP Evolved Packet System: CT WG4 Aspects (Stage3); Release 8 3GPP Standard; 3GPP TR 29.803, 3rd Generation Partnership Project (3GPP), Mobile Competence Centre.

3rd Generation Partnership Project; Technical Specification Group Services and System Aspects; 3GPP system to Wireless Local Area Network (WLAN) interworking; System description (Release 8) 3GPP Standard; 3GPP TS 23.234, 3rd Generation Partnership Project.

International Search Report and Written Opinion—PCT/US2010/028350, International Search Authority—European Patent Office—Sep. 30, 2010.

NEC: "Architecture alternative for Local IP access" 3GPP Draft; S2-091989 Local IP Access to Home, 3rd Generation Partnership Project (3GPP), Mobile Competence Centre ; 650, Route Des Lucioles ; F-06921 Sophia-Antipolis Cedex ; France, No. Hangzhou; 20090324, Mar. 24, 2009, XP050345321 [retrieved on Mar. 24, 2009] p. 1, paragraph 1-p. 3, paragraph 17.

Qualcomm Europe: "Local IP access baseline solution for EHNB" 3GPP Draft; S2-092308, 3rd Generation Partnership Project (3GPP), Mobile Competence Centre ; 650, Route Des Lucioles ; F-06921 Sophia-Antipolis Cedex ; France, No. Hangzhou; Mar. 24, 2009, XP050345597 [retrieved on Mar. 24, 2009] the whole document.

Siemens: "W-APN Resolution Procedure based on DNS Mechanisms" SGPP Draft; S2-040129, Srd Generation Partnership Project (SGPP), Mobile Competence Centre ; 650, Route Des Lucioles ; F-06921 Sophia-Antipolis Cedex ; France, vol. SA WG2, No. Innsbruck; 20040.

3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8), 3GPP Standard; 3GPP TS 29.274,3rd Generation Partnership Project (3GPP), Mobile Competence Centre; 650, Route Des Lucioles ; F-06921 Sophiaantipolis Cedex ; France, No. V8.0.0, Dec. 1, 2008, pp. 1-111, XP050372751.

Taiwan Search Report—TW099108576—TIPO—Jan. 19, 2014.

Qualcomm Europe, "Proposal for APN and NAI types ", 3GPP TSG SA WG2 Architecture—S2#58, S2-072416, pp. 1-8, Jun. 29, 2007,URL,http://www. 3gpp.org/ftp/tsg_sa/WG2_Arch/TSGS2_58_Orlando/Docs/S2-072416.zip.

Vodafone, "PDN GW selection", S2-071877, 3GPP TSG SA WG2 Architecture—S2#57, pp. 1-3, Apr. 23-27, 2007, Beijing, China.

ZTE, "Multiple PDN support", S2-082244, 3GPP TSG SA WG2 Meeting #64, pp. 1-4, Apr. 7-11, 2008, Jeju, Korea.

European Search Report—EP15172696—Search Authority—The Hague—Sep. 29, 2015.

European Search Report—EP15172700—Search Authority—The Hague—Oct. 8, 2015.

Taiwan Search Report—TW103127656—TIPO—Jun. 10, 2015.

* cited by examiner

ESTABLISHING PACKET DATA NETWORK CONNECTIVITY FOR LOCAL INTERNET PROTOCOL ACCESS TRAFFIC

CLAIM OF PRIORITY UNDER 35 U.S.C §119

The present application for patent claims priority to Provisional Patent Application Ser. No. 61/172,198 entitled "METHODS AND APPARATUS TO ENABLE ESTABLISHMENT OF PACKET DATA NETWORK (PDN) CONNECTIVITY FOR LOCAL INTERNET PROTOCOL (IP) ACCESS TRAFFIC" and filed Apr. 23, 2009, and to Provisional Patent Application Ser. No. 61/176,649 entitled "METHOD AND APPARATUS FOR LOCAL IP ACCESS CAPABILITY INDICATION" and filed May 8, 2009, each of which are assigned to the assignee hereof and hereby expressly incorporated by reference herein.

BACKGROUND

I. Field

The following description relates generally to wireless communications, and more particularly to facilitating packet data network connectivity for local Internet Protocol access traffic for wireless communication, in a network deployment.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

Recent advances in mobile communication involve integration of mobile networks and Internet Protocol (IP) based networks. This integration enables a vast amount of multimedia resources available over IP-type networks to be accessible on mobile phones, laptop computers, and so forth. In addition, this integration has enabled high quality voice communication, including circuit-switched and packet-switched communication, to be available over various types of network interface mechanisms (e.g., wireless local area network, Broadband IP, dial-up, cellular radio network, and so on). In addition, as core network infrastructure advances over time, additional mechanisms for achieving integrated mobile and IP communication are realized. Accordingly, ongoing optimization in wireless communication is a reality for modern wireless communication systems.

Additional advancements have seen various types of base stations deployed within a common area, resulting in a heterogeneous access point network. For instance, in addition to a conventional deployment of macro base stations, lower power base stations such as micro and pico base stations have been included within planned macro deployments, to provide targeted coverage in portions of a geographic region that observes poor signal strength from a macro base station in the geographic region. In other circumstances, one or more low power base stations can be deployed indoors in shopping malls, large buildings, and so on, to provide similar coverage for an indoor building or complex.

In addition to operator deployed base stations, a new type of base station deployed by subscribers or wireless service users are emerging. In contrast to operator deployed base stations, these subscriber-deployed base stations can be established in various locations by individual subscribers. Subscriber-deployed base stations can provide significant access benefits for wireless service users in a limited area, such as a person's home, office, apartment building, and so on. However, various challenges result as well, including mitigating interference from dense deployments of subscriber-deployed base stations, as well as emulating similar small power local access points, such as WiFi routers, and the like. Accordingly, significant ongoing development in wireless networking involves integrating subscriber-deployed base stations within planned base station deployments, and with other personal or local wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides for establishing local Internet Protocol access (LIPA) for cellular communication. According to particular aspects of the subject disclosure, disclosed are mechanisms to identify a request to establish a packet network connection for a user equipment (a UE) as a request for a LIPA context. Once identified, a local gateway associated with the UE or with a subscriber-deployed base station is identified, and a packet context is established to support LIPA traffic for the UE.

In other aspects, provided are mechanisms to manage UE mobility in a LIPA-enabled network. A wireless message can be received at a mobility management entity when the UE establishes a connection with a base station. The mobility management entity can then identify whether a LIPA context exists at a local gateway associated with the mobility management entity. If the LIPA context is available at the base station, the LIPA context can be maintained. Otherwise, the mobility management entity can send a terminate order to the local gateway to end the LIPA context.

In at least one other aspect, a UE can be configured to differentiate between a request for a conventional packet network connection, and a request for a LIPA context. If a request for a LIPA context is identified, the UE can generate an access point name (APN) associated with LIPA traffic, and forward that APN to a serving base station to initiate a LIPA context for the LIPA traffic. Accordingly, the UE can facilitate efficient implementation of a LIPA context in the context of a wireless communication.

Further to the above, various aspects relate to a method of wireless communication for establishing packet connectivity for local Internet Protocol access (LIPA) traffic. The method can comprise receiving an electronic message comprising a request for a packet data network connection (a PDN connection). In addition, the method can comprise determining whether the request for the PDN connection is a LIPA PDN request and identifying a local gateway (an L-GW) associated with the LIPA PDN request if the PDN connection is determined to be a LIPA PDN request.

In other aspects of the subject disclosure, provided is an apparatus configured to establish packet connectivity for LIPA traffic in conjunction with wireless communication. The apparatus can comprise a communication interface for transmitting and receiving electronic communication and memory for storing instructions configured to establish a network context for LIPA traffic, the instructions being implemented by computer-executable modules. Particularly, the modules include an analysis module that obtains a request for a packet network connection from the communication interface and determines whether the request is for LIPA traffic and an acquisition module that identifies a L-GW that supports LIPA traffic and that is associated with an entity originating the request.

In still other aspects, provided is an apparatus configured for establishing a LIPA context in conjunction with a wireless communication. The apparatus can comprise means for receiving an electronic message that comprises a request for a packet network connection and means for determining whether the request is a request to establish LIPA traffic. Furthermore, the apparatus can comprise means for identifying a L-GW for supporting the LIPA traffic if the request is determined to be the request to establish LIPA traffic.

According to another aspect, disclosed is at least one processor configured for establishing a LIPA context in conjunction with a wireless communication. The processor(s) can comprise a module that receives an electronic message that comprises a request for a packet network connection, and a module that determines whether the request is a request to establish LIPA traffic. Moreover, the processor(s) can comprise a module that identifies a L-GW for supporting the LIPA traffic if the request is determined to be the request to establish LIPA traffic.

According to an additional aspect, the subject disclosure provides a computer program product comprising a computer-readable medium. The computer-readable medium can comprise code for causing a computer to receive an electronic message that comprises a request for a packet network connection, and code for causing the computer to determine whether the request is a request to establish LIPA traffic. Furthermore, the computer-readable medium can comprise code for causing the computer to identify a L-GW associated with the LIPA traffic if the request is determined to be the request to establish LIPA traffic.

In addition to the foregoing, disclosed is a method for wireless communication. The method can comprise identifying a request for a PDN connection as being a request for LIPA traffic. Moreover, the method can comprise generating a LIPA APN, and wirelessly transmitting the LIPA APN and the request for the PDN connection to a serving base station to initiate a PDN connection for the LIPA traffic.

According to further aspects, provided is an apparatus configured for wireless communication. The apparatus can comprise a wireless communication interface for sending and receiving wireless communication. Additionally, the apparatus can comprise memory for storing instructions to initiate a LIPA network context, the instructions being implemented by computer-executable modules. More specifically, these modules can comprise a filtering module that determines whether a request to establish a packet network context relates to a LIPA PDN, and a context module that generates a LIPA APN and includes the LIPA APN within a wireless message for requesting a PDN connection, wherein the wireless message is transmitted by the wireless communication interface to a base station serving the apparatus.

In another aspect, the subject disclosure provides an apparatus for wireless communication. The apparatus can comprise means for identifying a request for a PDN connection as being a request for LIPA traffic. In addition, the apparatus can comprise means for generating a LIPA APN. Moreover, the apparatus can also comprise means for wirelessly transmitting the LIPA APN and the request for the PDN connection to a serving base station to initiate a PDN connection for the LIPA traffic.

According to one or more additional aspects, disclosed is at least one processor configured for wireless communication. The processor(s) can comprise a module that identifies a request for a PDN connection as being a request for LIPA traffic. Further, the processor(s) can comprise a module that generates a LIPA APN and a module that wirelessly transmits the LIPA APN and the request for the PDN connection to a serving base station to initiate a PDN connection for the LIPA traffic.

In another aspect, the subject disclosure includes a computer program product comprising a computer-readable medium. The computer-readable medium can comprise code for causing a computer to identify a request for a PDN connection as being a request for LIPA traffic. Moreover, the computer-readable medium can comprise code for causing a computer to generate a LIPA APN, and code for causing the computer to wirelessly transmit the LIPA APN and the request for the PDN connection to a serving base station to initiate a PDN connection for the LIPA traffic.

According to still other aspects of the subject disclosure, provided is a method of terminating packet connectivity for LIPA traffic involving a wireless communication. The method can comprise receiving a message that indicates an access terminal is establishing a wireless connection with a base station. Further, the method can comprise determining that an existing LIPA PDN context is not available for use at the base station. The method can also comprise sending a deactivation request to a L-GW associated with the existing LIPA PDN context to terminate the existing LIPA PDN context.

In an additional aspect, provided is an apparatus configured for terminating a LIPA context associated with a wireless communication. The apparatus can comprise a communication interface for sending and receiving electronic messages and a memory for storing instructions configured to identify and terminate an inactive LIPA context, the instructions being implemented by computer-executable modules. These modules can comprise an evaluation module that receives an electronic message relating to mobility of a user equipment (a UE) from the communication interface, identifies whether an existing LIPA context is associated with the UE, and determines whether the existing LIPA context provides service at a node communicatively coupled with the apparatus. Further, the modules can comprise a termination module that sends a release order to a L-GW associated with the node if the existing LIPA context does not provide current service at the node.

The subject disclosure further provides an apparatus configured to terminate a LIPA context associated with a wireless communication. The apparatus can comprise means for receiving a message that indicates an access terminal is establishing a wireless connection with a base station. Additionally, the apparatus can comprise means for determining that an existing LIPA PDN context is not available for use at the base station. Moreover, the apparatus can also comprise means for sending a deactivation request to a L-GW associated with the existing LIPA PDN context to terminate the existing LIPA PDN context.

According to still other aspects, disclosed is at least one processor configured to terminate a LIPA context associated with a wireless communication. The processor(s) can comprise a module that receives a message indicating that an access terminal is establishing a wireless connection with a base station. In addition, the processor(s) can comprise a module that determines that an existing LIPA PDN context is not available for use at the base station. The processor(s) can further comprise a module that sends a deactivation request to a L-GW associated with the existing LIPA PDN context to terminate the existing LIPA PDN context.

In one or more additional aspects, the subject disclosure provides for a computer program product, comprising a computer-readable medium. The computer-readable medium can comprise code for causing a computer to receive a message indicating that an access terminal is establishing a wireless connection with a base station. Furthermore, the computer-readable medium can comprise code for causing the computer to determine that an existing LIPA PDN context is not available for use at the base station. Moreover, the computer-readable medium can also comprise code for causing the computer to send a deactivation request to a L-GW associated with the existing LIPA PDN context to terminate the existing LIPA PDN context.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
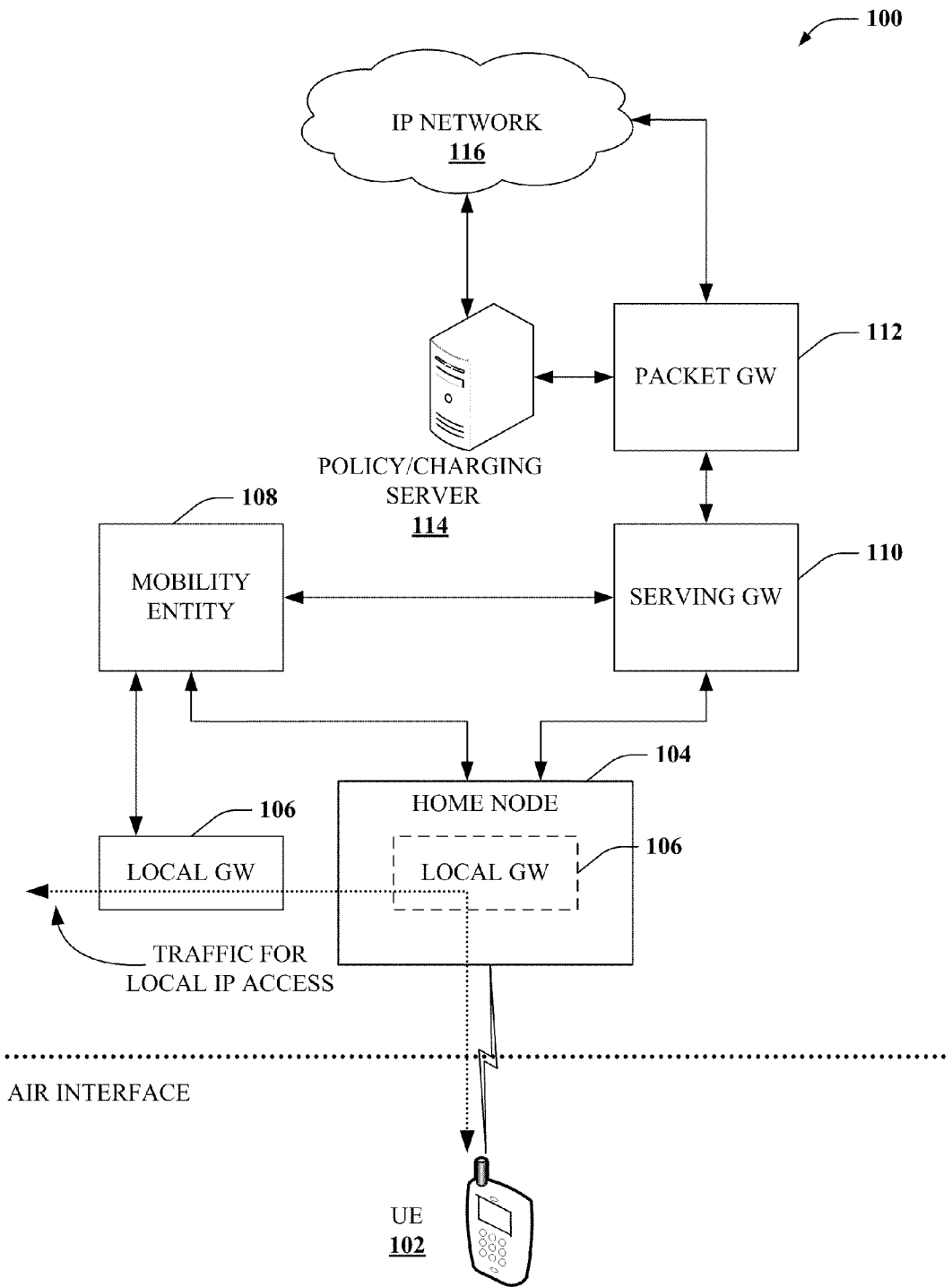
FIG. 1 illustrates a block diagram of an example wireless communication system that supports local Internet Protocol access (LIPA) wireless communication.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context establishing and terminating LIPA connections in conjunction with subscriber-deployed base stations, among other things. One skilled in the art should appreciate that similar techniques could apply to other communication environments.

Introduction of subscriber-deployed base station into wireless access networks enables significant flexibility and consumer control over personal access to such networks. These subscriber-deployed base stations are also referred to as home base stations, and can include home Node B (HNB) base stations, enhanced HNB, or home eNode B (HeNB) (where the term H(e)NB refers to an entity that could be either an HNB or an HeNB), femtocells, femto base stations, or the like. Although these are distinct examples of subscriber-deployed base stations, these terms are used interchangeably herein to refer to subscriber-deployed base stations in general, except where otherwise noted (e.g., in conjunction with a particular cellular system that employs only one or another such base station).

As network wireless infrastructure and resources increase over time, and as processing and user interface capabilities of mobile devices become more sophisticated, users are able to employ mobile devices to perform functions formerly available only with personal computers and fixed line communications. The ability to employ a small, portable device for high quality voice communication, Internet access, multimedia access and playback, and entertainment, results in a highly desirable consumer product. However, because the macro wireless network is deployed for large-scale public usage, indoor reception can often be poorer than outdoor reception (e.g., due to absorption of radio frequency signals by buildings, insulation, ground landscaping, etc.). Subscriber-deployed base stations technology provides a user with significant control over personal wireless connectivity, often obviating most or all indoor connectivity problems. Thus, subscriber-deployed base stations can further extend user equipment (UE) mobility even in a sub-optimal environment for macro networks.

Additionally, home base stations can be configured to provide local Internet Protocol access to other devices in the home or enterprise network. In general, the traffic associated with other devices in the home or enterprise network is referred to as local Internet Protocol access (LIPA) traffic. In order for a UE to employ a home base station to communicate with entities within a home network, an IP point of attachment is created at a home node, or home access point (which, e.g., can be the home base station, or an entity that includes the home base station and other components). Providing an IP point of attachment implies creation of a packet network connection, and termination of a Gi reference point or a SGi reference point in a node that provides the IP point of attachment. The packet network connection can include, e.g., a packet data network connection (a PDN connection), a packet data protocol context (a PDP context), or the like, whereas the Gi reference point is a reference point between a gateway GPRS serving node (GGSN) and a PDN, and the SGI reference point is a reference point between a PDN gateway and the PDN. In addition, the node that provides the IP point of attachment can include, e.g., a home node, a home access point, the GGSN, the PDN gateway, etc. A PDN, as utilized herein, can refer to an operator external public or private packet data network, or an intra operator packet data network, for provision of IP multimedia subsystem (IMS) services, for instance.

Modeling LIPA connectivity to emulate other IP connectivity provided to a UE involves emulating functionality of providing an IP point of attachment for LIPA in a home node, and can be modeled by introducing a reference point similar to the Gi or SGi reference point, which is terminated at the home node itself. This similar reference point is then assigned to providing an IP point of attachment only for the LIPA traffic, which can be referred to as a local SGi reference point, or L-SGi reference point. Based on existing wireless protocols, a node assigns an IP address to a UE for the UE to access locally routed traffic at the home node. The entity responsible for this is a packet data network gateway, or PDN GW or a GGSN. Thus, to emulate local router activity at an H(e)NB, a subset of the PDN GW/GGSN is placed within the home node. The subset of the PDN GW/GGSN is referred to herein as a local PDN gateway (L-PGW), or simply a local gateway (L-GW). This L-GW can support a PDN connection or PDP context for LIPA traffic, assigning the IP address for the UE to access local traffic. Some challenges pertaining to the L-GW still exist. Examples include distinguishing between a request for LIPA PDN connection and a conventional PDN connection, and how to terminate existing LIPA PDN connections when a UE connects to another base station or access point (e.g., performs a handover from the H(e)NB to a macro base station). Various aspects of the subject disclosure address these and related problems.

FIG. 1 illustrates a block diagram of an example wireless communication system 100 according to aspects of the subject disclosure. Wireless communication system 100 comprises a user equipment (a UE) 102 wirelessly coupled with a home node (e.g., a subscriber-deployed base station or access point) 104, over an air interface. The home node 104 is coupled with a (L-GW) 106 that supports LIPA IP connections for terminals coupled with home node 104. (Alternatively, L-GW 106 can be included as part of home node 104, as depicted by the dashed line). The small dotted line indicates a route which local IP traffic takes for UE 102.

To implement voice or data services to home node 104, the home node is coupled with a mobility entity 108 (e.g., a mobility management entity [MME] and to a serving gateway 110. Mobility entity 108 can be employed to facilitate access to a wireless service provider network (e.g., a cellular network), an IP connection to support IP traffic (e.g., at a packet gateway 112), and further can establish a context or connection for LIPA traffic at L-GW 106. These services can be implemented through a serving gateway 110, which in turn is coupled to packet gateway 112. Packet gateway 112 accesses a policy and charging server 114 to verify subscription, subscription status, billing rate, accessible services, and so on, for UE 102. If a subscription associated with UE 102 supports IP traffic, packet gateway 112 can allow access to one or more IP networks 116 (e.g., the Internet, an intranet, IP-related services, and so on) to facilitate that IP traffic.

To establish a voice or data call, UE 102 initiates and transmits a request for such traffic to home node 104. Home node 104 then forwards the request to mobility entity 108. Mobility entity 108 determines what type of service is associated with the request, and initiates a connection for the traffic at a suitable gateway associated with home node 104. One issue for mobility entity 108 is distinguishing a request for a LIPA connection from a request for a conventional IP connection. Another issue for mobility entity 108 is to cancel or terminate existing LIPA connections that are not currently in use. These issues are discussed in more detail below.

Figure 2:
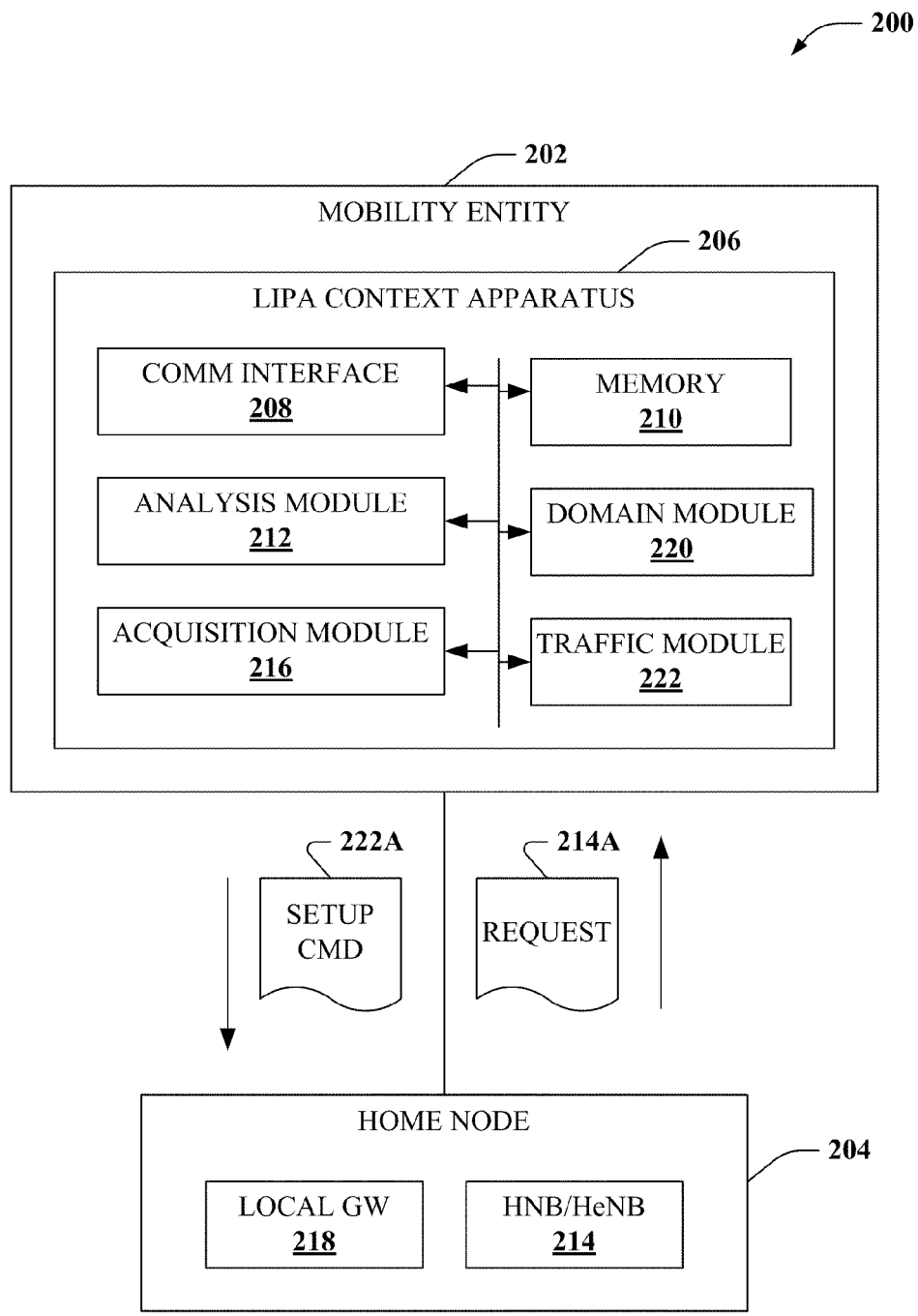
FIG. 2 depicts a block diagram of a sample apparatus that facilitates setup of a packet network connection for LIPA traffic according to aspects disclosed herein.

FIG. 2 illustrates a block diagram of an example wireless communication system 200 according to particular aspects of the subject disclosure. Wireless communication system 200 comprises a mobility entity 202 communicatively coupled with a home node 204 (e.g., a subscriber-deployed base station). Examples of a suitable mobility entity 202 can include an MME for a long term evolution wireless network, a serving GPRS support node [S-GSN] of a universal mobile telecommunications system network, or the like. Mobility entity 202 can be configured to manage initiation and termination of IP connections for one or more UEs (not depicted) served by home node 204. To determine a type of connection required to service a connection request, mobility entity 202 can employ a LIPA context apparatus 206. LIPA context apparatus 206 can comprise a communication interface 208 for transmitting and receiving electronic communication over a wired communication link. In one instance, the wired communication link can comprise an S11 link with a H(e)NB 214 associated with home node 204, or a local S11 (L-S11) link with a L-GW 218 associated with home node 204. Additionally, an S1 interface or an Iu wired interface can communicatively couple mobility entity 202 and H(e)NB 214 (depending on a particular network implementation in which mobility entity 202 and home node 204 are incorporated within).

In addition to the foregoing, LIPA context apparatus 206 can comprise memory 210 for storing instructions configured to establish a network context for LIPA traffic, wherein the instructions can be implemented by computer-executable modules. These modules can include an analysis module 212 that is configured to obtain from communication interface 208 a request 214A for a packet network connection transmitted by a H(e)NB 214 of home node 204 (initiated by a UE served by home node 204). Additionally, analysis module 212 can be a module that determines whether request 214A is for LIPA traffic. In one instance, this determination can be implementing by identifying whether an access point name (an APN) included with the request comprises a term specifically associated with a LIPA connection, or with LIPA traffic. This term can include the term 'LIPA', for instance, or 'local', or another suitable term. An association of APN terms with a LIPA connection can be stored in memory 210, for instance, which can be referenced by analysis module 212 to make the above determination. In another instance, the determination can be implemented by identifying whether a second entity (compared with an entity originating request 214A, see below) routing the request to mobility entity 202 is a home base station, or a home base station gateway. Analysis module 212 can infer as a default, for instance, that an IP request routed by an H(e)NB 214 is a request for a LIPA connection.

Further to the above, LIPA context apparatus 206 can comprise an acquisition module 216 that identifies a L-GW 218 that supports LIPA traffic and that is associated with an entity originating request 214A (e.g., a UE). Various mechanisms can be employed for identifying L-GW 218. In one example, acquisition module 216 can analyze request 214A for an IP address of H(e)NB 214. The IP address can be specified in an explicit information element of a wireless message that comprises request 214A, or can be extracted from a source IP header of the wireless message, for instance. If the IP address is found, a traffic setup module 222 can be employed to send a setup command 222A to the IP address. Thus, for instance, if L-GW 218 and H(e)NB 214 are collocated and share a common IP address, the setup command 222A can be received at L-GW 218, which in turn establishes a LIPA PDN context in response to receiving the setup command 222A.

If request 214A does not contain the IP address of H(e)NB 214, or if the context is not established upon sending setup command 222A to the IP address, acquisition module 216 can employ a domain module 220 to analyze request 214A for a defined LIPA access point name (a defined LIPA APN) specified with request 214A. If the defined LIPA APN is identified, domain module 220 employs the defined LIPA APN to form a fully qualified domain name (a FQDN). Domain module 220 then utilizes the FQDN to perform a domain name server query (a DNS query), and obtains the IP address of L-GW 218 in response to the DNS query. Traffic setup module 222 can then send setup command 222A to the IP address of L-GW 218, to initiate the LIPA PDN context.

Figure 3:
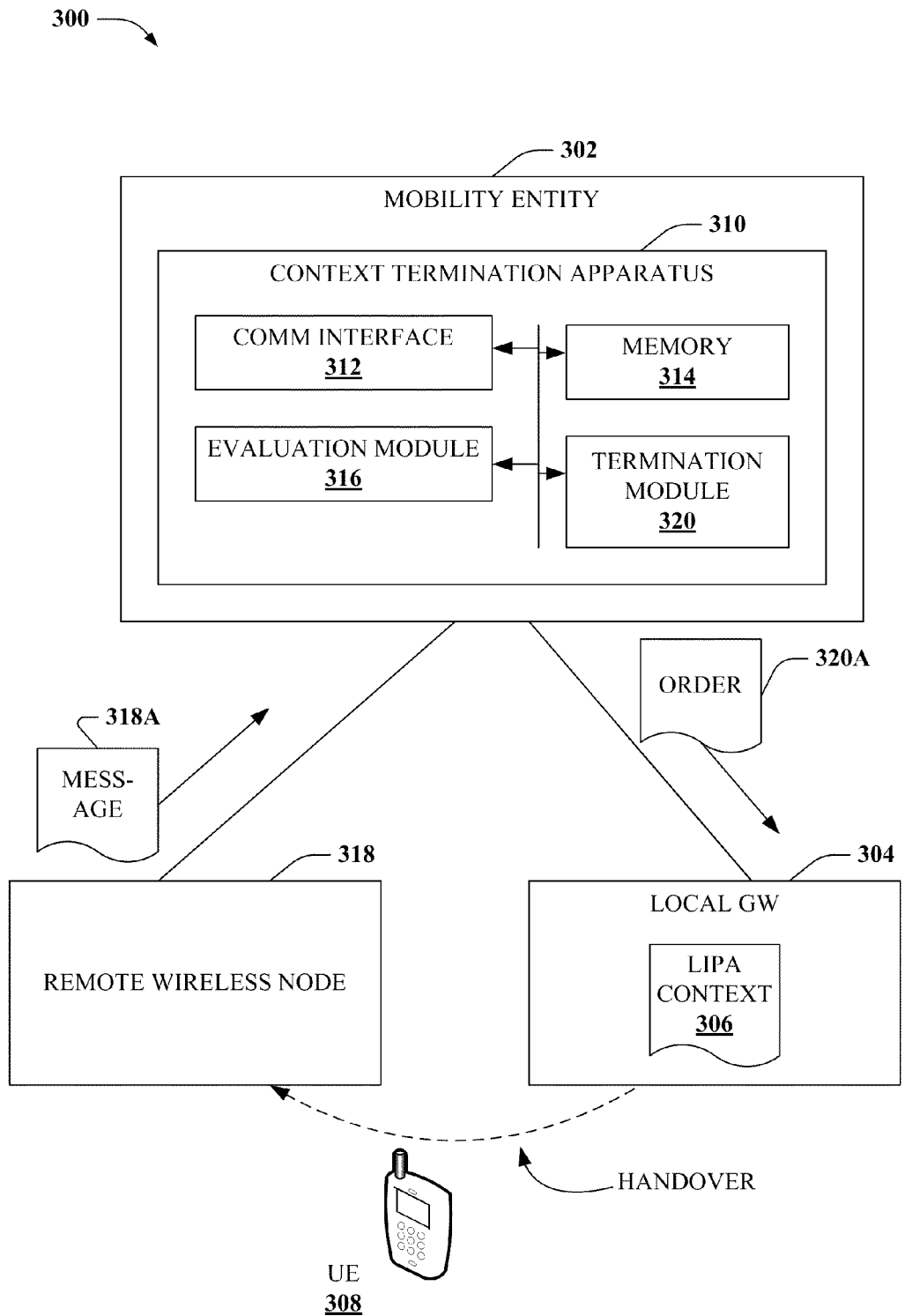
FIG. 3 illustrates a block diagram of a sample apparatus that supports mobility for LIPA-related wireless communication in additional aspects.

FIG. 3 depicts a block diagram of an example network system 300 that can support mobility for a UE 308 in a LIPA-enabled network. Particularly, network system 300 can comprise a mobility entity 302 configured to identify and terminate LIPA connections resulting from UE 308 handing off from a home base station (not depicted—but that is coupled to a L-GW 304 where a LIPA context 306 is established for UE 308), to another home base station, to a macro network, or any suitable remote wireless node 318 (referring to a node other than L-GW 304).

To implement mobility support, mobility entity 302 can comprise a context termination apparatus 310. Context termination apparatus 310 can comprise a communication interface 312 for sending and receiving electronic messages with L-GW 304 and remote wireless node 318, among other entities (e.g., a home node associated with L-GW 304, or a network gateway—not depicted). Additionally, context termination apparatus 310 can comprise memory 314 for storing instructions configured to identify and terminate an inactive LIPA context. These instructions can be implemented by one or more computer-executable modules included with context termination apparatus 310. Particularly, an evaluation module 316 can be employed as a module that receives an electronic message 318A from communication interface 312 relating to mobility of UE 308, and identifies an existing LIPA context 306 associated with the UE 308. Electronic message 318A can be, e.g., a wired message, a wireless message, or a suitable combination of wired and wireless messages, such as a wireless message transmitted by UE 308, and re-packaged as a wired message by remote wireless node 318. As an example, electronic message 318A can be a network message sent by remote wireless node 318 indicating that a connection is established between UE 308 and remote wireless node 318. In one instance, therefore, an electronic message can be received at communication interface 312 if an access terminal (UE 308) coupled with a node associated with L-GW 304 performs a handover to a second node (remote wireless node 318). In another instance, the electronic message can be received at communication interface 312 if the access terminal establishes an initial connection with the second node (e.g., camps on the second node, or includes the second node in an active set of base stations, depending on configurations of the access terminal).

Once electronic message 318A is received, and existing LIPA context 306 is identified, evaluation module 316 determines whether the existing LPA context 306 provides service at a node communicatively coupled with mobility entity 302. This determination can be based at least in part on comparing an identifier (e.g., an IP address) of remote wireless node 318 to an identifier associated with existing LIPA context 306, for instance. As another example, the determination can be based at least in part on extracting an IP address from a source IP header of electronic message 318A and determining that the IP address does not match an IP address associated with L-GW 304. If electronic message 318A includes an information element that specifies an IP address of an L-GW associated with remote wireless node 318, evaluation module 316 can obtain this IP address from the information element and determine whether the IP address of L-GW 304 does or does not match the IP address of the L-GW associated with remote wireless node 318. In either case, if the IP address of remote wireless node 318 or an IP address of the L-GW associated with remote wireless node 318 does not match the IP address of L-GW 304, evaluation module 316 can infer that the UE 308 is no longer coupled with L-GW 304, indicating that the existing LIPA context 306 is unavailable for use by UE 308.

Once the determination by evaluation module 316 is made, context termination apparatus 310 can employ a termination module 320 that sends a release order 320A to L-GW 304 if the existing LIPA context 306 does not provide current service at a node serving UE 308. Upon receiving the release order 320A, L-GW 304 deletes the existing LIPA context 306. As a result, context termination apparatus 310 can be employed to distinguish between valid and invalid LIPA contexts, and terminate those contexts that are unavailable for use by a UE initiating the context.

Figure 4:
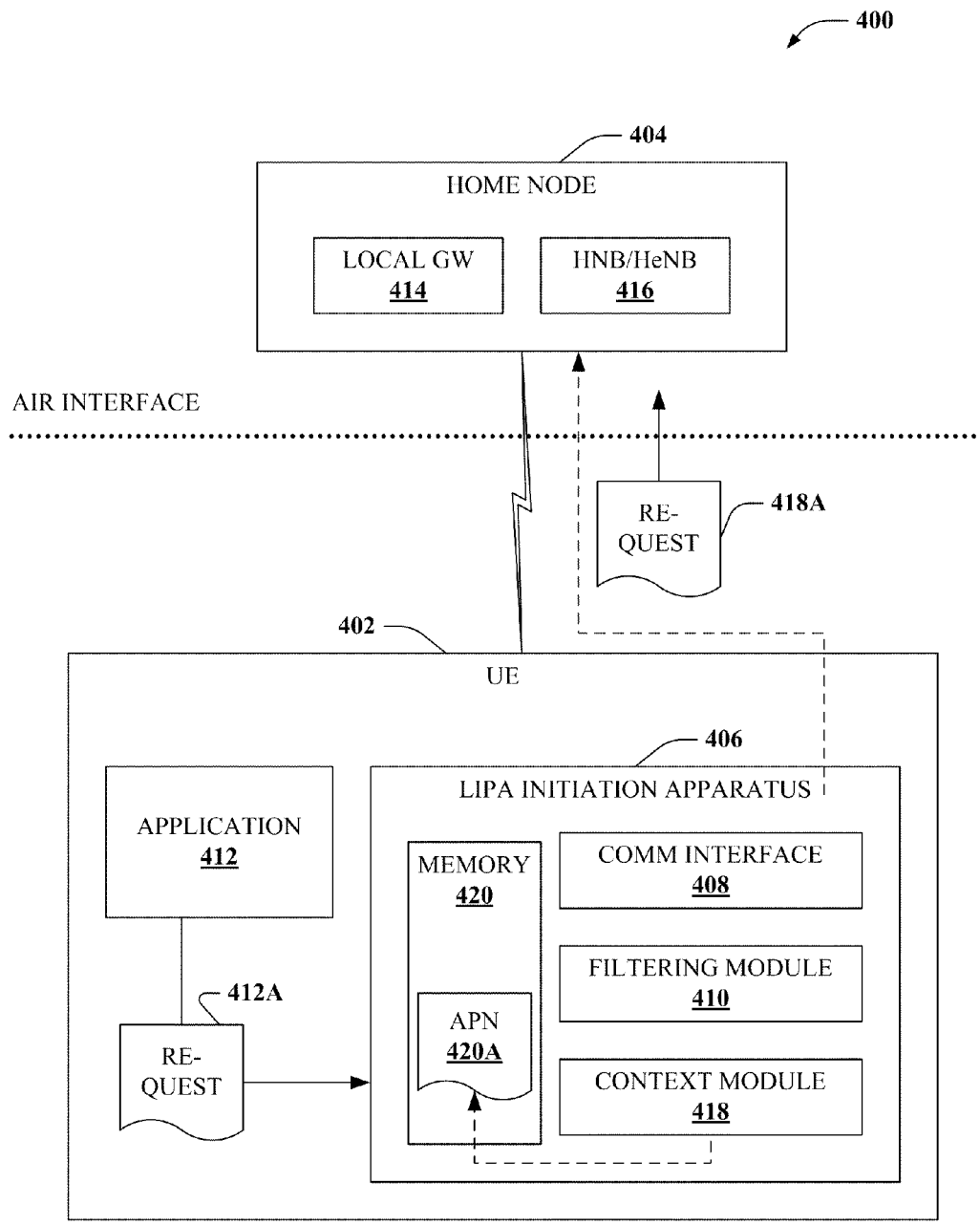
FIG. 4 depicts a block diagram of an example apparatus configured for identifying and initiating a LIPA context for wireless communication.

FIG. 4 illustrates a block diagram of an additional example wireless system 400 according to still other aspects of the subject disclosure. Wireless system 400 comprises a UE 402 communicatively coupled with a home node 404 over an air interface. Home node 404 comprises an H(e)NB 416, and can further comprise a L-GW 414, which can be collocated with H(e)NB 416 at home node 404, or can be external to home node 404 in an alternative aspect (e.g., comprising a separate IP address as home node 404 or H(e)NB 416.

UE 402 is configured to assist in distinguishing between requests for a conventional IP connection, which are implemented at a network packet gateway (e.g., packet gateway 112 of FIG. 1, supra) and requests for a LIPA connection, which can be implemented at L-GW 414. Particularly, UE 402 can comprise a LIPA initiation apparatus 406. LIPA initiation apparatus 406 can comprise a wireless communication interface 408 for sending and receiving wireless communication. In one instance, wireless communication interface 408 can include a wireless transceiver of UE 402; in another instance, wireless communication interface 408 can be an interface that couples with and employs the wireless transceiver of UE 402 instead. Additionally, LIPA initiation apparatus 406 can comprise memory 420 for storing instructions to initiate a LIPA network context, the instructions being implemented by a set of computer-executable modules of LIPA initiation apparatus 406.

In operation, LIPA initiation apparatus 406 can comprise a filtering module 410 that determines whether a request 412A to establish a packet network context relates to a LIPA packet data network (a LIPA PDN). As an example, filtering module 410 determines that request 412A relates to a LIPA PDN if request 412A originates from an application 412 that solicits LIPA traffic, or if request 412A originates from an application configured to access a local network. In another example, filtering module 410 determines that request 412A relates to a LIPA PDN if a base station serving UE 402 (e.g., home node 404) is a home base station. In yet another example, filtering module 410 determines that request 412A relates to a LIPA PDN if the base station serving UE 402 is associated with LIPA traffic. This association can be explicitly specified by home node 404, or can be based on a list of LIPA-related home nodes stored in memory 420.

Once filtering module 410 identifies request 412A as a request for a LIPA PDN, a context module 418 can be employed that generates a LIPA APN 420A and includes the LIPA APN 420A within a wireless message 418A for requesting a PDN connection. The wireless message 418A is then transmitted by wireless communication interface 408 to a base station serving UE 402 (H(e)NB 416). Upon receiving request 412A, H(e)NB 416 establishes the LIPA PDN at L-GW 414, to facilitate LIPA communication for UE 402. In one particular aspect, context module 418 can generate the LIPA APN 420A in one of several manners. In one instance, context module 418 generates the LIPA APN 420A at last in part from a home base station identifier of the base station serving UE 402. This home base station identifier can comprise an IP address, or other suitable identifier such as a cell identifier, a base station identifier, a Node B identifier, an eNode B identifier, a Closed Subscriber Group (CSG) identifier, a Location/Routing/Tracking area identifier, and so on. In another instance, context module 418 generates the LIPA APN 420A at least in part with an explicit term that is associated with a LIPA PDN. For instance, the term 'LIPA', 'local', 'home', 'work', 'enterprise', 'hot spot' or the like, can be employed as the explicit term. Thus, as one illustrative example, context module 418 generates the LIPA APN at least in part with explicit use of 'LIPA' in the LIPA APN, which implies that request 412A is the request for the LIPA PDN.

Figure 5:
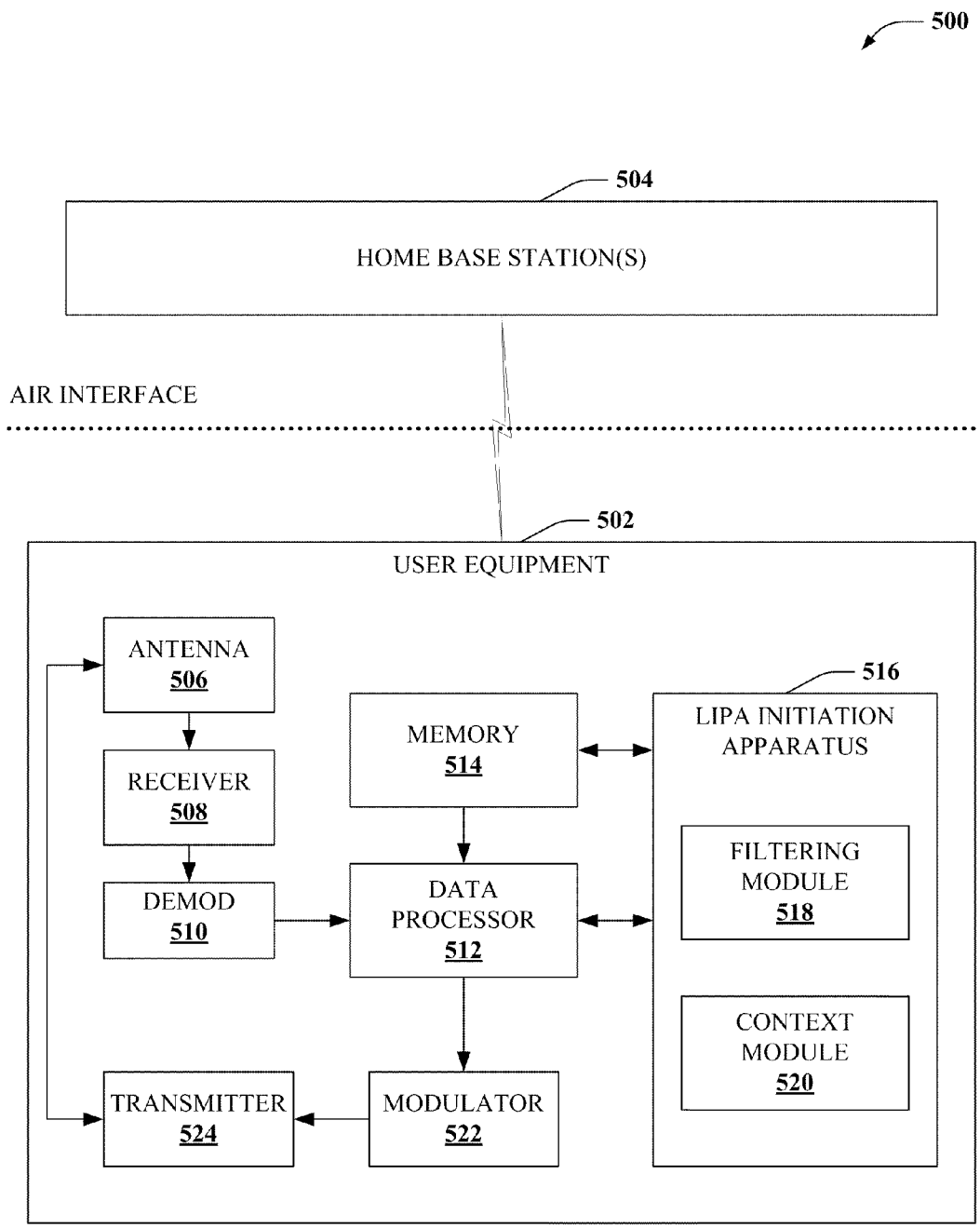
FIG. 5 illustrates a block diagram of a sample user equipment (UE) according to various aspects of the subject disclosure.

FIG. 5 illustrates a block diagram of an example system 500 comprising a UE 502 communicatively coupled with one or more subscriber-deployed base stations (Home BS) 504 over a wireless communication interface. Home BS(s) 504 transmits on DL subframes, whereas UE 502 responds on UL subframes. Further, UE 502 can be configured to request an IP connection to be established at Home BS(s) 504, for both conventional IP traffic and for LIPA traffic, as described herein.

UE 502 includes at least one antenna 506 (e.g., comprising one or more input/output interfaces) that receives a signal and receiver(s) 508, which performs typical actions (e.g., filters, amplifies, down-converts, etc.) on the received signal. In general, antenna 506 and a transmitter 524 (collectively referred to as a transceiver) can be configured to facilitate wireless data exchange with home BS(s) 504. Further, antenna 506, transmitter 524, receiver 508, demodulator 510 and modulator 522 can be employed as a wireless communication interface by various components of UE 502, including data processor 512 and a LIPA initiation apparatus 516.

Antenna 506 and receivers) 508 can also be coupled with a demodulator 510 that can demodulate received symbols and provide such signals to a data processor(s) 512 for evaluation. It should be appreciated that data processor(s) 512 can control and/or reference one or more components (antenna 506, receiver 508, demodulator 510, memory 514, LIPA initiation apparatus 516, modulator 522, transmitter 524) of UE 502. Further, data processor(s) 512 can execute one or more modules, applications, engines, or the like that comprise information or controls pertinent to executing functions of UE 502.

Additionally, memory 514 of UE 502 is operatively coupled to data processor(s) 512. Memory 514 can store data to be transmitted, received, and the like, and instructions suitable to conduct wireless communication with a remote device (e.g., home BS(s) 504). Specifically, the instructions can be utilized to implement the various functions described above, or elsewhere herein. Further, although not depicted, memory 514 can store the modules, applications, engines, etc. (e.g., filtering module 518, context module 520) associated with LIPA initiation apparatus 516 and executed by processor(s) 512, above.

LIPA initiation apparatus 516 can be employed by UE 502 to distinguish a request for a LIPA PDN connection, as described herein. Further, it should be appreciated that in some aspects of the subject disclosure LIPA initiation apparatus 516 can be substantially similar to LIPA initiation apparatus 406 of FIG. 4, supra. Accordingly, UE 502 can employ filtering module 518 to analyze a request for a packet network context and determine whether the request relates to a LIPA PDN. Additionally, a context module 520 can be employed that generates a LIPA APN and includes the LIPA APN within a wireless message for requesting a LIPA PDN connection. This wireless message can be transmitted by data processor 512 employing modulator 522, transmitter 524 and antenna 506 to one or more of home BS(s) 504, to initiate establishment of a LIPA PDN connection at a L-GW associated with the one or more of home BS(s) 504.

Figure 6:
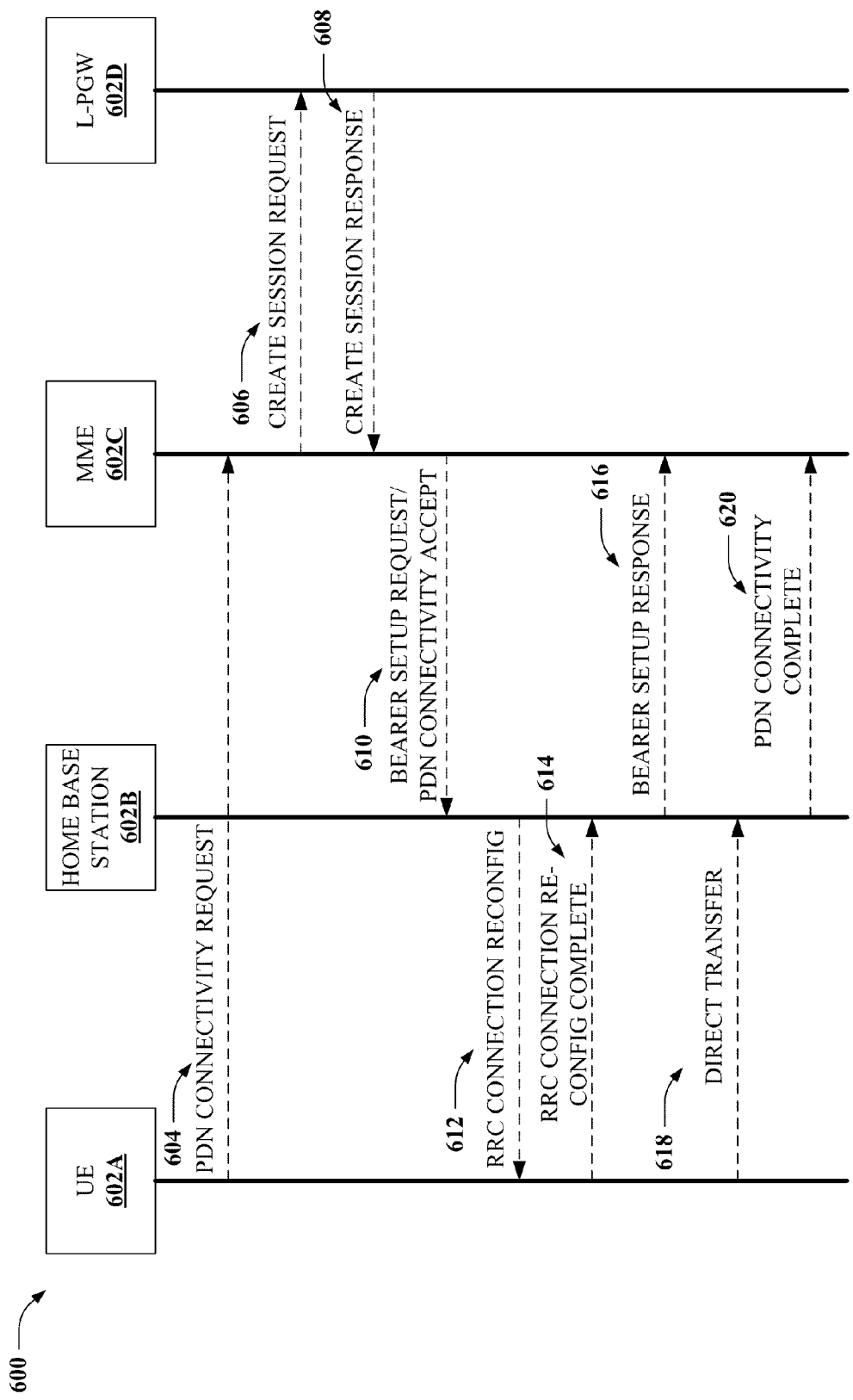
FIG. 6 depicts a diagram of an example network call setup diagram according to still other aspects of the subject disclosure.

FIG. 6 illustrates an example network call diagram 600 of a LIPA setup operation according to aspects of the subject disclosure. Network call diagram 600 comprises several network-related entities, including UE 602A, home base station 602B, MME 602C, and L-PGW 602D. At 604, UE 602A initiates a PDN connectivity request, which is sent to MME 602C. At 606, MME 602C initiates a create session request message that is forwarded to L-PGW 602D. The create session request message can specifically be a message for requesting a LIPA context, by identifying the PDN connectivity request as a request for a LIPA PDN, as described herein. Further, MME 602C can identify a suitable L-PGW 602D for establishing the LIPA PDN for UE 602A, also as described herein.

At 608, L-PGW 602D sends a create session response message to MME 602C. MME 602C then initiates a bearer setup request/PDN connectivity accept message sent to home base station 602B at 610. Upon receiving the bearer setup request/PDN connectivity accept message, home base station 602B sends an RRC connection reconfiguration message to UE 602A at 612. At 614, UE 602A responds with an RRC connection reconfiguration complete message. Home base station 602B then sends a bearer setup response message at 616 to MME 602C. Further, UE 602A initiates a direct transfer to home base station 602B at 618. Network call diagram 600 completes with a PDN connectivity complete message at 620, which is sent by home base station 602B to MME 602C.

Figure 7:
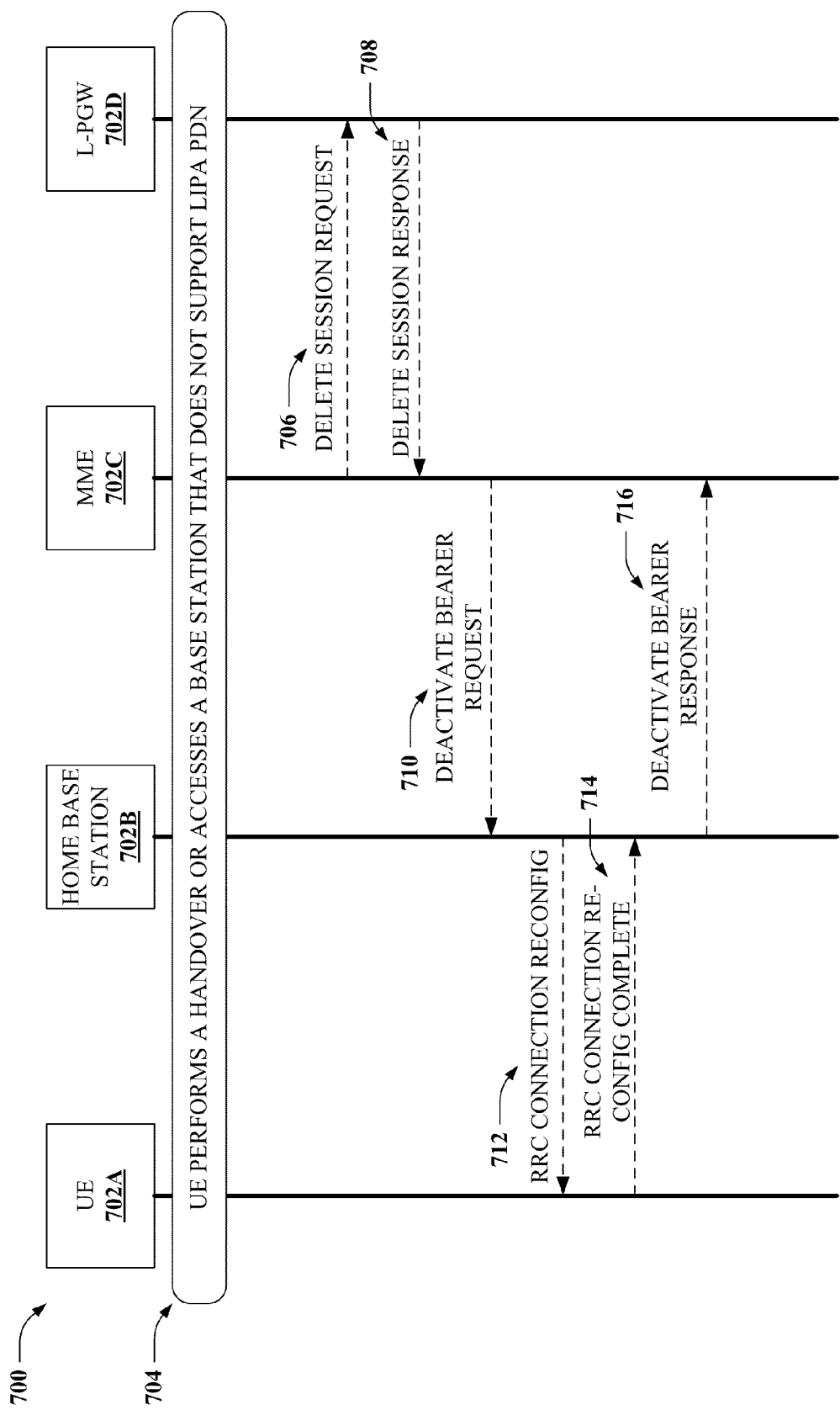
FIG. 7 illustrates a diagram of a sample network call termination diagram according to another aspect of the subject disclosure.

FIG. 7 illustrates a sample network call diagram 700 for a LIPA termination operation according to additional aspects of the subject disclosure. The LIPA termination operation involves a UE 702A, home base station 702B, MME 702C, and L-PGW 702D. At 704, UE 702A performs a handover, or establishes an initial access connection, with a base station that does not support a LIPA PDN (a base station other than home base station 702B, which can include a macro base station, or another home base station). At 706, MME 702C initiates a delete session request message and sends this message to L-PGW 702D. This message can be initiated by MME 702C upon receiving an indication that UE 702A has conducted a handover or base station access procedure, and determining that an existing LIPA PDN is inactive, as described herein. Further, at 708, L-PGW 702D responds with a delete session response message sent to MME 702C. At 710, MME 702C initiates a deactivate bearer request message and sends this message to home base station 702B. At 712, home base station 702B sends an RRC connection reconfiguration message to UE 702A. In response, UE 702A sends an RRC connection reconfiguration complete message to home base station 702B at 714.

Network call diagram 700 terminates at 716, where home base station 702B sends a deactivate bearer response message to MME 702C.

The aforementioned systems, call diagrams, or apparatuses have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a wireless communication system could include mobility entity 202 comprising LIPA context apparatus 206 and context termination apparatus 310, home node 204, and UE 502 comprising LIPA initiation apparatus 516, or a different combination of these or other entities. Sub-modules could also be implemented as modules communicatively coupled to other modules rather than included within parent modules. Additionally, it should be noted that one or more modules could be combined into a single module providing aggregate functionality. For instance, evaluation module 316 can include termination module 320, or vice versa, to facilitate identifying an inactive LIPA context and issuing an order to release the inactive LIPA context by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
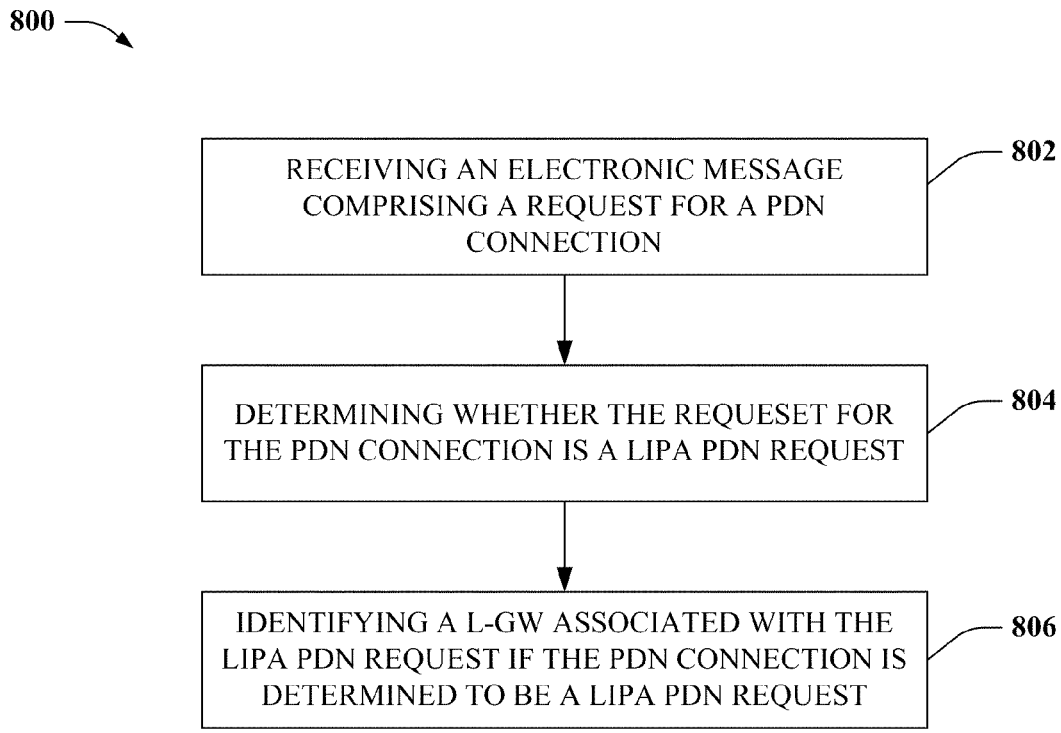
FIG. 8 illustrates a flowchart of a sample methodology providing network support for a LIPA context for cellular communication according to further aspects.

FIG. 8 depicts a flowchart of an example methodology 800 for establishing a LIPA connection for a mobile device according to aspects of the subject disclosure. At 802, method 800 can comprise receiving an electronic message comprising a request for a packet data network connection (a PDN connection). The electronic message can be a wireless message, a wired message, or a suitable combination thereof. At 804, method 800 can comprise determining whether the PDN connection is a LIPA PDN request. This determination can be made, for instance, by comparing an APN associated with the request for the PDN connection to a list of LIPA APN names. Alternatively, this determination can be made by identifying a term within the APN that is associated with a LIPA connection. Such a term can include 'LIPA', 'local', 'home', 'work', 'enterprise', 'hot spot', or the like, or a suitable combination thereof. Additionally, at 806, method 800 can comprise identifying a L-GW associated with the LIPA PDN request if the PDN connection is determined to be a LIPA PDN request. Identifying the L-GW can be accomplished in one or more suitable manners, for instance, by obtaining an IP address of the L-GW. This can be accomplished by extracting the IP address from a header of the electronic message, and equating the IP address to the L-GW. In another instance, this can be accomplished by receiving the IP address in conjunction with the electronic message, for example, if the IP address is transmitted with the electronic message or is included as part of the electronic message. In another example, identifying the L-GW can comprise performing a DNS query for the L-GW with a DNS server, and receiving an IP address of the L-GW from the DNS server. The DNS query can be performed by extracting a LIPA APN from the LIPA PDN request, and forming a fully qualified domain name from the LIPA APN, and performing the DNS query with the fully qualified domain name. In at least one case, identifying the L-GW comprises obtaining an IP address of a home base station coupled with the L-GW and employing the IP address of the home base station as an IP address of the L-GW. This latter implementation can be utilized, for instance, where the L-GW is collocated with the home base station.

Once the L-GW or IP address of the L-GW is identified, method 800 can further comprise sending a session request message to the L-GW to establish the PDN connection with the L-GW (e.g., see network call diagram 600, supra). Once established, a response can be sent to an entity initiating the request for the PDN connection received at reference number 802. The PDN connection can be maintained until terminated by the entity, or until the PDN connection is deemed inactive.

Figure 9:
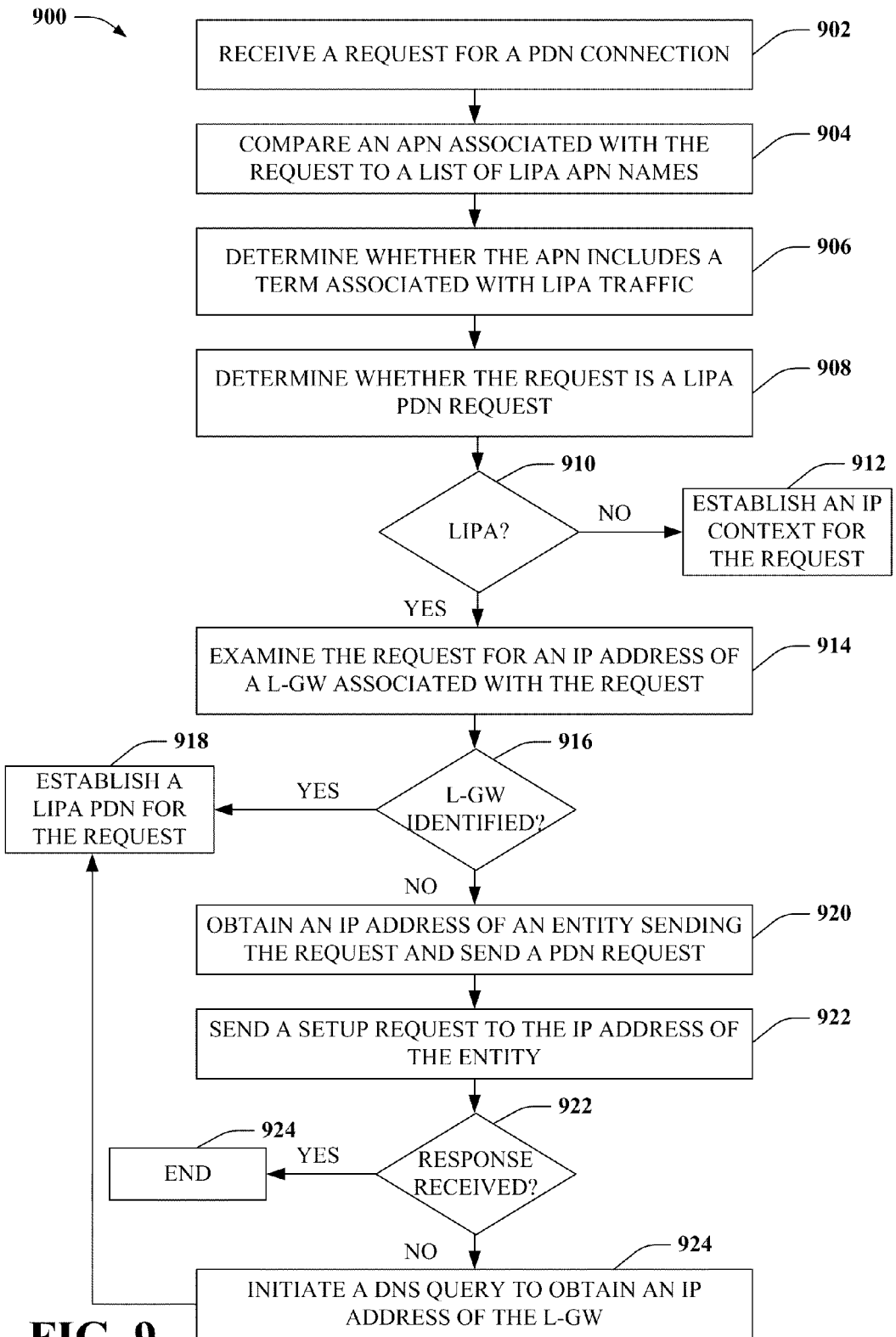
FIG. 9 depicts a flowchart of an example methodology for identifying and establishing a LIPA packet data network context according to still other aspects.

FIG. 9 illustrates a flowchart of an additional methodology 900 according to still other aspects of the subject disclosure. At 902, method 900 can comprise receiving a request for a PDN connection. At 904, method 900 can comprise comparing an APN associated with the request (included within the request, or received in conjunction with the request) to a list of LIPA APN names, or a list of terms associated with the LIPA PDN connection. At 906, method 900 can comprise determining whether the APN includes a term associated with LIPA traffic, and at 908, method 900 can determine whether the request is indeed a LIPA PDN request. At 910, if the request is a LIPA PDN request, method 900 proceeds to 914; otherwise the request is deemed to be a request for a conventional PDN connection for non-local IP traffic. In the latter case, method 900 proceeds to 912 and establishes a conventional IP context for the request.

At 914, method 900 can examine the request to obtain an IP address or other suitable identifier of an L-GW associated with the request, or associated with an entity initiating the request (e.g., a home base station serving the entity). This can be accomplished by analyzing the request to determine whether the identifier or IP address was transmitted within the request, or in conjunction with the request. At 916, a determination is made as to whether the L-GW is identified by obtaining the identifier or IP address. If so, method 900 proceeds to 918 where a create default bearer request is transmitted to the L-GW to establish the PDN connection with the L-GW. Otherwise, if the L-GW is not identified at reference number 916, method 900 proceeds to 920.

At 920, method 900 can comprise obtaining an IP address of an entity sending the request from an IP header of the request, and at 922 sending the default bearer request setup to the IP address of the entity. At 924, if a bearer setup response is received, method 900 can end at 924; otherwise, method 900 can infer that the IP address of the entity is not an IP address of the L-GW, and proceed to 924. At 924, method 900 can initiate a DNS query to obtain the IP address of the L-GW, and upon receiving the IP address, proceed to reference number 918 to establish the LIPA PDN in response to the request, by sending the bearer request setup to the IP address obtained in response to the DNS query.

Figure 10:
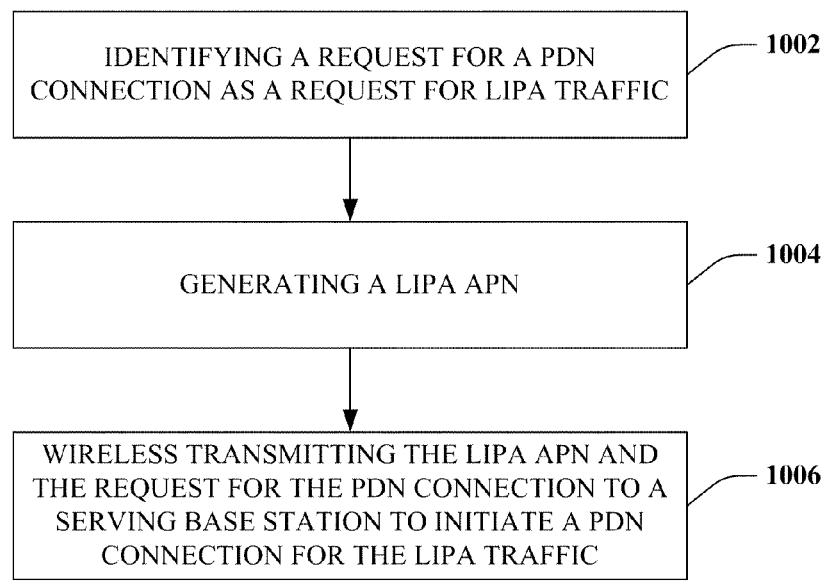
FIG. 10 illustrates a flowchart of a sample methodology for initiating a request for a LIPA context in another aspect of the subject disclosure.

FIG. 10 depicts a flowchart of an example methodology 1000 for facilitating establishment of a LIPA connection in conjunction with a wireless communication. At 1002, method 1000 can comprise identifying a request for a PDN connection as being a request for LIPA traffic. Identifying the request for the PDN connection as being a request for LIPA traffic can comprise determining that a base station serving a UE (a serving base station) initiating the request is a home base station, in one instance. In another example, the identifying can instead comprise determining that the request is initiated from a software application that calls for LIPA traffic, or a request from a software application to access a local network.

At 1004, method 1000 can comprise generating a LIPA APN upon identifying the request as being a request for LIPA traffic. In at least one aspect of the subject disclosure, generating the LIPA APN can be based on first determining that the serving base station is associated with LIPA wireless service, although the subject disclosure is not limited to this one aspect. In addition, generating the LIPA APN can further comprise specifying a home base station identifier of a serving base station as part of the LIPA APN. This can be utilized, for instance, where the home base station identifier is associated with LIPA traffic. As an alternative, generating the LIPA APN can instead comprise explicitly specifying a term associated with LIPA traffic, such as the term 'LIPA', as part of the LIPA APN.

At 1006, method 1000 can comprise wirelessly transmitting the LIPA APN and the request for the PDN connection to the serving base station to initiate a PDN connection for the LIPA traffic. Particularly, where the LIPA APN implies that LIPA traffic is requested, or is constructed in a manner that implies LIPA traffic is requested, the serving base station can easily distinguish the request for the PDN connection from a request for non-LIPA traffic.

Figure 11:
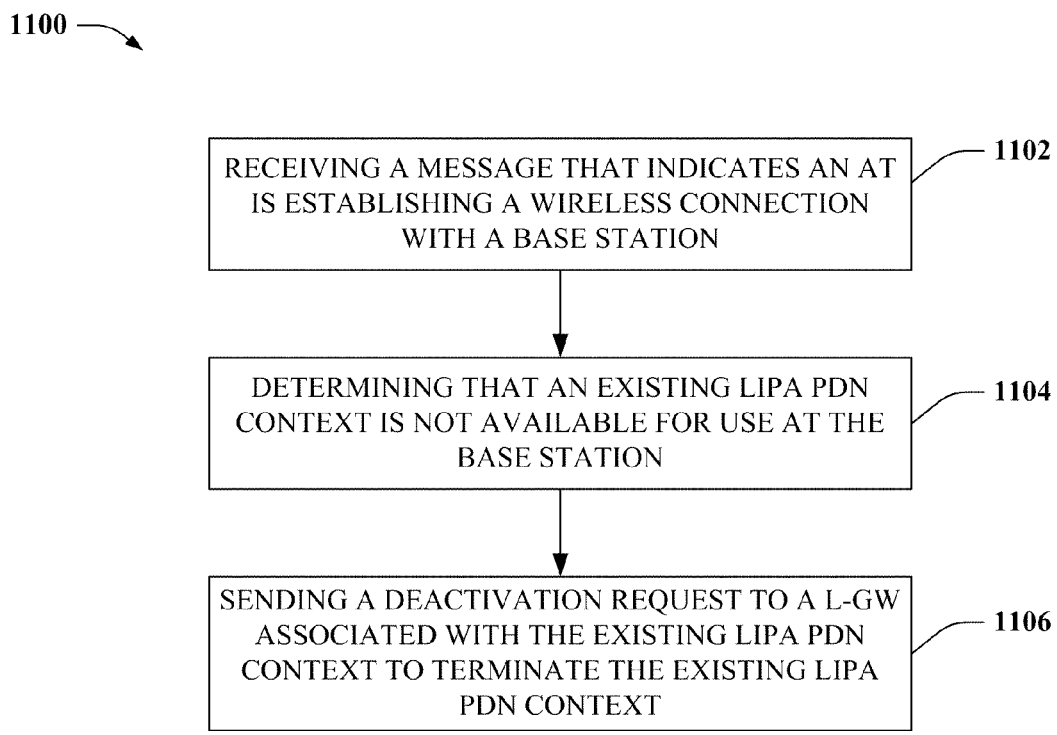
FIG. 11 depicts a flowchart of an example methodology for terminating a LIPA context to support mobility for cellular communication.

FIG. 11 depicts a flowchart of a sample methodology 1100 for terminating packet connectivity for a LIPA connection involving a wireless communication to support mobility in a wireless network. At 1102, method 1100 can comprise receiving a message that indicates an access terminal is establishing a wireless connection with a base station. In one instance, receiving the message is caused by the access terminal performing a handover to the base station. In an alternative instance, receiving the message is caused by the access terminal establishing an initial connection with the base station.

At 1104, method 1100 can comprise determining that an existing LIPA packet data network context (an existing LIPA PDN context) is not available for use at the base station. This determination can comprise comparing an identifier of the base station to an identifier associated with the existing LIPA PDN context, and inferring that the existing LIPA PDN context is not available for use at the base station if the identifiers do not match. As an alternative, the determination can comprise extracting an IP address from the message and determining that the IP address does not match an IP address associated with the base station. In the latter case, the same inference pertaining to the existing LIPA PDN context can also be made. However, in yet another alternative aspect, the determination can instead comprise receiving a local gateway IP address that is explicitly transmitted with the message and comparing the local gateway IP address with an IP address of the L-GW associated with the existing LIPA PDN context. In this case, an inference can be drawn that the existing LIPA PDN context is not available for use at the base station upon determining that the local gateway IP address does not match the IP address of the L-GW associated with the existing LIPA PDN context. Upon completing the determination at reference number 1104, method 1100 can comprise sending a deactivation request to a L-GW associated with the existing LIPA PDN context to terminate the existing LIPA PDN context at 1106.

Figure 12:
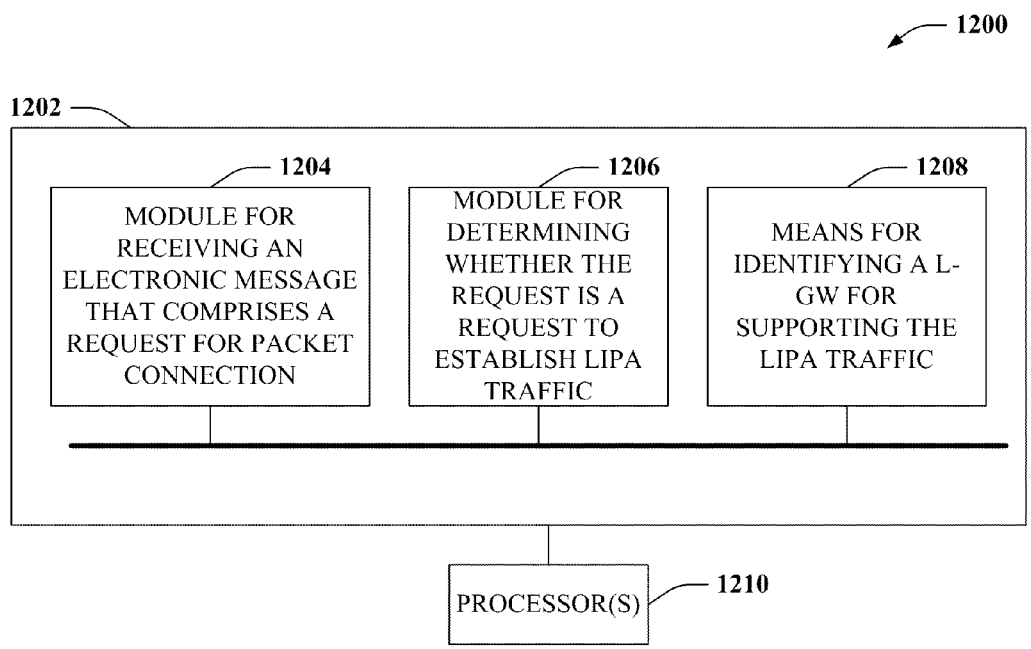
FIG. 12 illustrates a block diagram of an example electronic device for establishing a LIPA context for cellular communication according to still other aspects.
Figure 13:
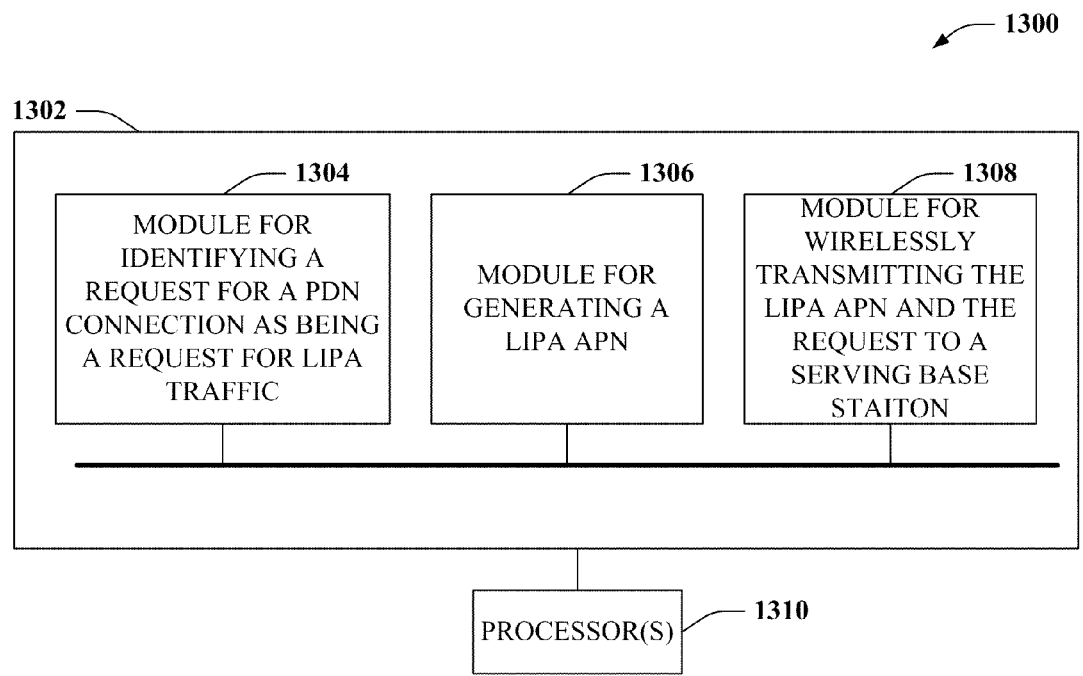
FIG. 13 depicts a block diagram of a sample electronic device for identifying a request for and initiating a LIPA network connection.
Figure 14:
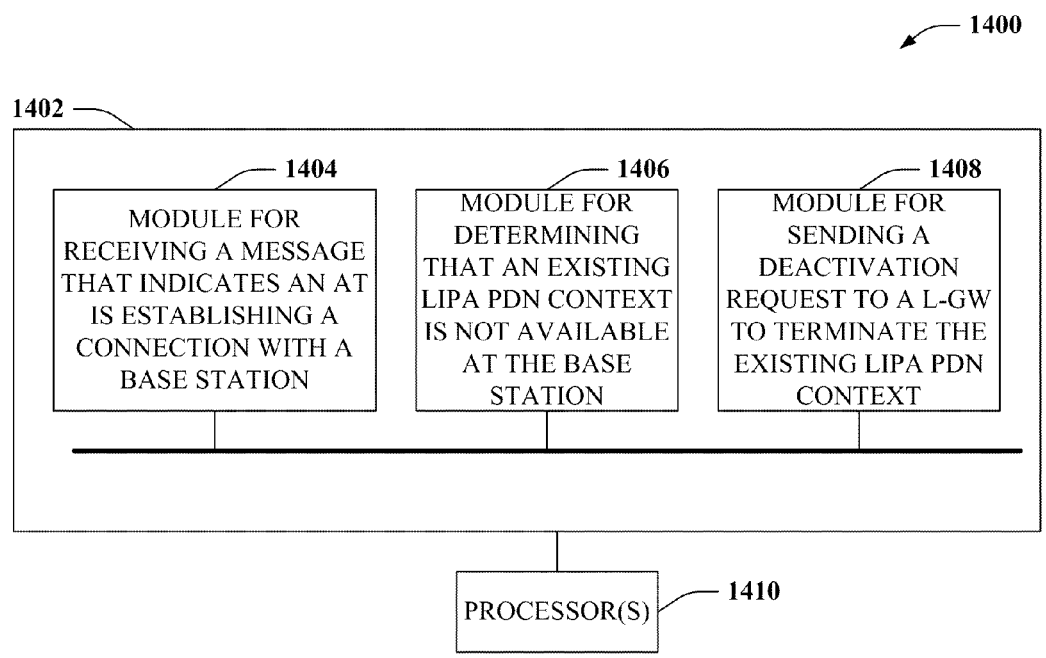
FIG. 14 illustrates a block diagram of a sample electronic device that facilitates termination of an existing LIPA context at a wireless node.

FIGS. 12, 13 and 14 illustrate respective example apparatuses 1200, 1300, 1400 configured to facilitate wireless communication for a local IP network, according to aspects of the subject disclosure. For instance, apparatuses 1200, 1300, 1400 can reside at least partially within a wireless communication network and/or within a wireless receiver such as a node, base station, access point, user terminal, personal computer coupled with a mobile interface card, or the like. It is to be appreciated that apparatuses 1200, 1300, 1400 are represented as including functional blocks, which can be functional blocks that represent functions implemented by a processor, software, or combination thereof (e.g., firmware).

Apparatus 1200 comprises memory 1202 for storing instructions or modules configured to implement features of apparatus 1200, including distinguishing a LIPA PDN request from a conventional IP PDN request, and establishing a LIPA PDN context, and a processor 1210 for executing those instructions or modules. Particularly, apparatus 1200 can comprise a module 1204 for receiving an electronic message that comprises a request for a PDN connection. Additionally, apparatus 1200 can comprise a module 1206 for determining whether the request is a request to establish LIPA traffic. The determination can be based on whether the request is forwarded from a home node base station, for instance, or whether the request specifies a LIPA network, or comprises a LIPA APN. Further, apparatus 1200 can comprise a module 1208 for identifying a L-GW for supporting the LIPA traffic if the request is determined to be the request to establish LIPA traffic. Identifying the L-GW can be based on obtaining an IP address for the L-GW, by inferring the IP address is the same as an IP address of an entity forwarding the request, or by extracting the IP address of the L-GW from the request, or by obtaining a LIPA PAN from the request and performing a DNS query with the LIPA APN and receiving the IP address of the L-GW from a DNS server.

Apparatus 1300 comprises memory 1302 for storing one or more modules or instructions for implementing features of apparatus 1300, which includes facilitating LIPA for wireless communication, and a processor 1310 for executing the modules or instructions. Specifically, apparatus 1300 can comprise a module 1304 for identifying a request for a PDN connection as being a request for LIPA traffic. Further, apparatus 1300 can comprise a module 1306 for generating a LIPA APN based upon the determination of module 1304. Moreover, apparatus 1300 can further comprise a module 1308 for wirelessly transmitting the LIPA APN and the request for the PDN connection to a serving base station providing wireless service for apparatus 1300, or for an entity coupled with apparatus 1300, to initiate a PDN connection for the LIPA traffic.

Apparatus 1400 comprises memory 1402 for storing instructions and modules for supporting mobility in conjunction with providing LIPA for wireless communication, and particularly for identifying and terminating inactive LIPA contexts. In addition, apparatus 1400 can comprise processor 1410 for executing the foregoing modules and instructions. Further to the above, apparatus 1400 can comprise a module 1404 for receiving a message that indicates an access terminal is establishing a wireless connection with a base station. This message can be received in response to the access terminal establishing an initial connection with the base station, camping on the base station, requesting service from the base station, or performing a handover to the base station, or the like. Additionally, apparatus 1400 can comprise a module 1406 for determining that an existing LIPA PDN context is not available for use at the base station. The determination can be made, for instance, by comparing an identifier or IP address of the base station with a comparable identifier or IP address of an L-GW supporting the existing LIPA PDN context. In addition to the foregoing, apparatus 1400 can comprise a module 1408 for sending a deactivation request to the L-GW supporting the existing LIPA PDN context to terminate the existing LIPA PDN context.

Figure 15:
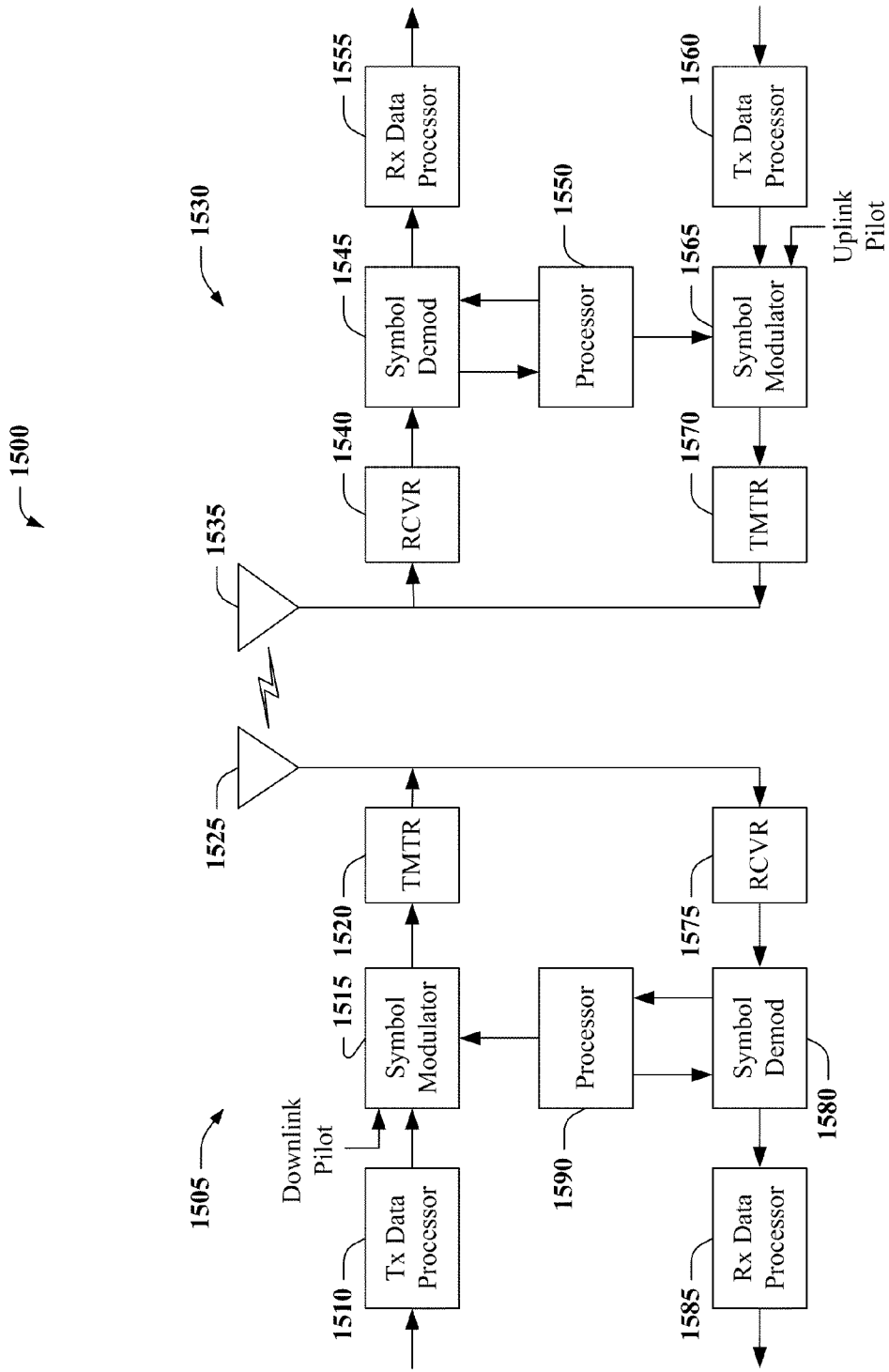
FIG. 15 depicts a block diagram of a sample wireless communications apparatus that can implement various aspects of the subject disclosure.

FIG. 15 depicts a block diagram of an example system 1500 that can facilitate wireless communication according to some aspects disclosed herein. On a DL, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and provides them to a transmitter unit (TMTR) 1520. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1520 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1525 to the terminals. At terminal 1530, an antenna 1535 receives the DL signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 demodulates and provides received pilot symbols to a processor 1550 for channel estimation. Symbol demodulator 1545 further receives a frequency response estimate for the DL from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the UL, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an UL signal, which is transmitted by the antenna 1535 to the access point 1505. Specifically, the UL signal can be in accordance with SC-FDMA requirements and can include frequency hopping mechanisms as described herein.

At access point 1505, the UL signal from terminal 1530 is received by the antenna 1525 and processed by a receiver unit 1575 to obtain samples. A symbol demodulator 1580 then processes the samples and provides received pilot symbols and data symbol estimates for the UL. An RX data processor 1585 processes the data symbol estimates to recover the traffic data transmitted by terminal 1530. A processor 1590 performs channel estimation for each active terminal transmitting on the UL. Multiple terminals can transmit pilot concurrently on the UL on their respective assigned sets of pilot sub-bands, where the pilot sub-band sets can be interlaced.

Processors 1590 and 1550 direct (e.g., control, coordinate, manage, etc.) operation at access point 1505 and terminal 1530, respectively. Respective processors 1590 and 1550 can be associated with memory units (not shown) that store program codes and data. Processors 1590 and 1550 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1590 and 1550.

Figure 16:
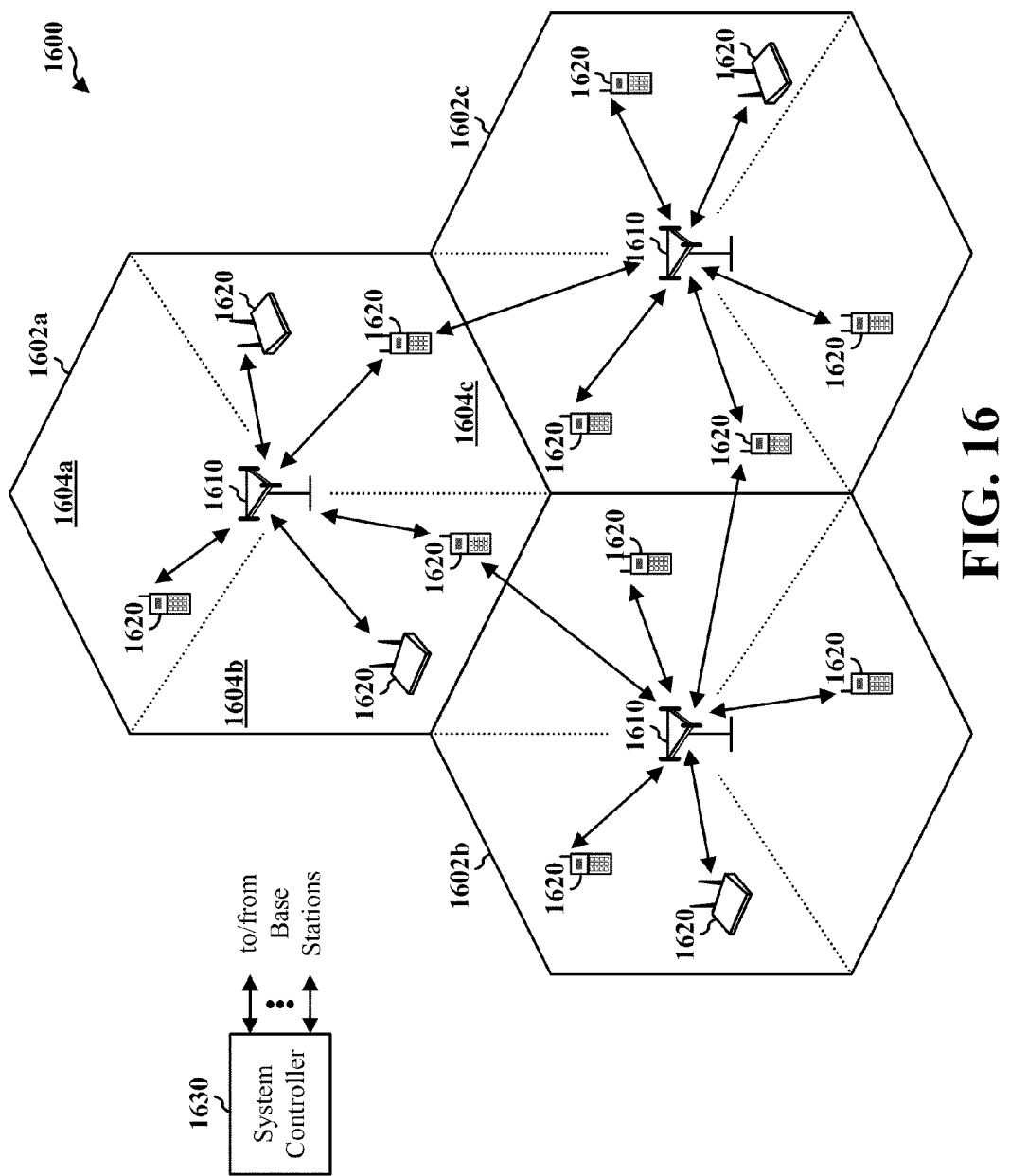
FIG. 16 illustrates a block diagram of a sample cellular environment for wireless communications according to further aspects.

FIG. 16 illustrates a wireless communication system 1600 with multiple base stations (BSs) 1610 (e.g., wireless access points, wireless communication apparatus) and multiple terminals 1620 (e.g., ATs), such as can be utilized in conjunction with one or more aspects. A BS 1610 is generally a fixed station that communicates with the terminals and can also be called an access point, a Node B, or some other terminology. Each BS 1610 provides communication coverage for a particular geographic area or coverage area, illustrated as three geographic areas in FIG. 16, labeled 1602*a*, 1602*b*, and 1602*c*. The term "cell" can refer to a BS or its coverage area depending on the context in which the term is used. To improve system capacity, a BS geographic area/coverage area can be partitioned into multiple smaller areas (e.g., three smaller areas, according to cell 1602*a* in FIG. 16), 1604*a*, 1604*b*, and 1604*c*. Each smaller area (1604*a*, 1604*b*, 1604*c*) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1620 are typically dispersed throughout the system, and each terminal 1620 can be fixed or mobile. Terminals 1620 can also be called a mobile station, user equipment, a user device, wireless communication apparatus, an access terminal, a user terminal or some other terminology. A terminal 1620 can be a wireless device, a cellular phone, a personal digital assistant (PDA), a wireless modem card, and so on. Each terminal 1620 can communicate with zero, one, or multiple BSs 1610 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1630 couples to base stations 1610 and provides coordination and control for BSs 1610. For a distributed architecture, BSs 1610 can communicate with one another as needed (e.g., by way of a wired or wireless backhaul network communicatively coupling the BSs 1610). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 17:
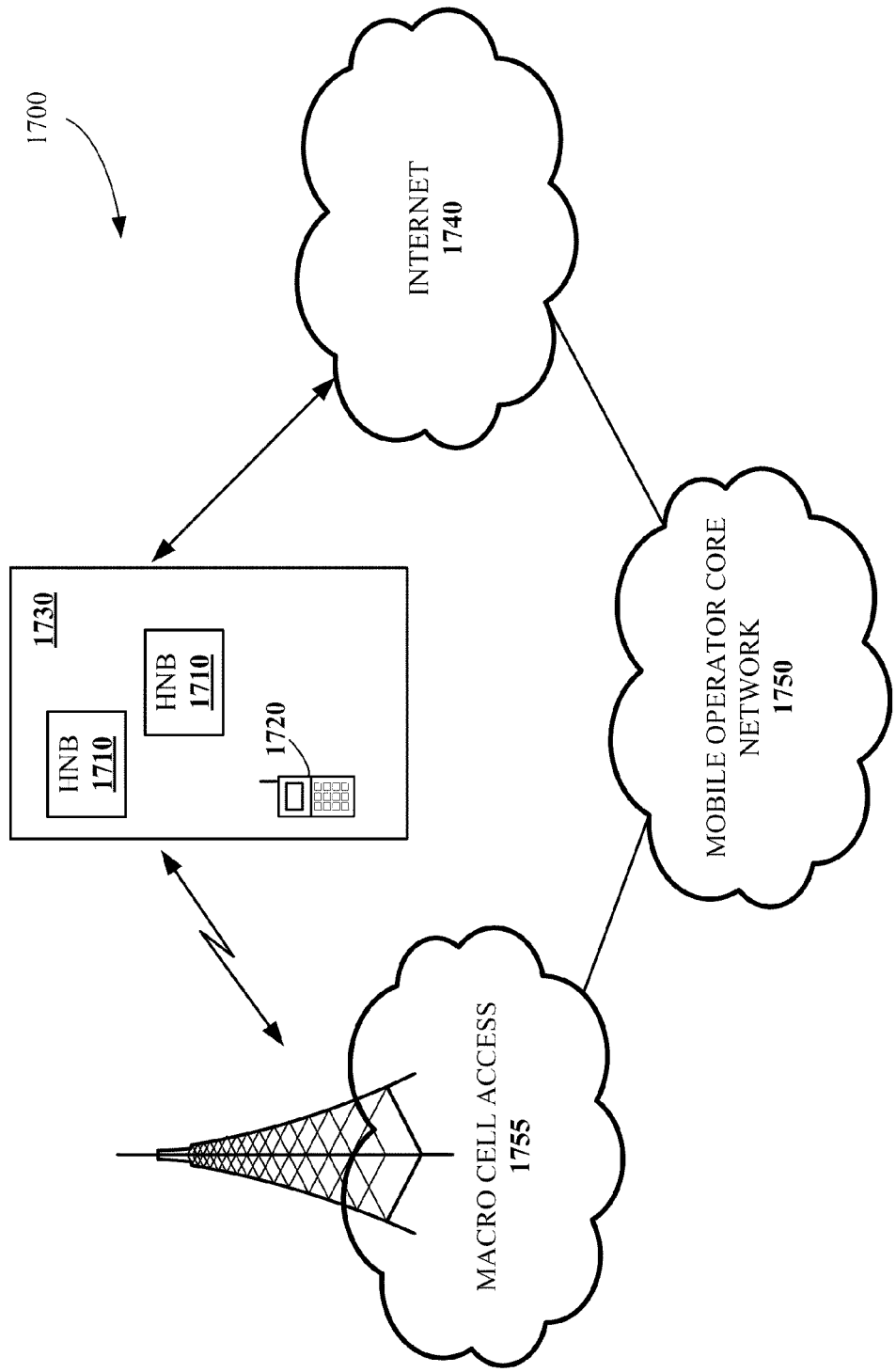
FIG. 17 illustrates an exemplary communication system enabling deployment of access point base stations within a network environment.

FIG. 17 is an illustration of a planned or semi-planned wireless communication environment 1700, in accordance with various aspects. Communication environment 1700 includes multiple access point BSs including HNBs 1710, each of which are installed in corresponding small scale network environments. Examples of small scale network environments can include user residences, places of business, indoor/outdoor facilities 1730, and so forth. The HNBs 1710 can be configured to serve associated UEs 1720 (e.g., included in a CSG associated with HNBs 1710), or optionally alien or visitor UEs 1720 (e.g., that are not configured for the CSG of the HNB 1710). Each HNB 1710 is further coupled to the Internet 1740 and a mobile operator core network 1750 via a DSL router (not shown), or, alternatively, a cable modem, broadband over power line connection, satellite Internet connection, or a like broadband Internet connection (not shown).

To implement wireless services via HNBs 1710, an owner of the HNBs 1710 subscribes to mobile service, such as 3G mobile services, offered through the mobile operator core network 1750. Also, the UE 1720 can be capable to operate in a macro cellular environment and/or in a residential small scale network environment, utilizing various techniques described herein. Thus, at least in some disclosed aspects, HNB 1710 can be backward compatible with any suitable existing UE 1720. Furthermore, in addition to the macro cell mobile network 1755, UE 1720 is served by a predetermined number of HNBs 1710, specifically HNBs 1710 that reside within a corresponding user residence(s), place(s) of business, or indoor/outdoor facilities 1730, and cannot be in a soft handover state with the macro cell mobile network 1755 of the mobile operator core network 1750. It should be appreciated that although aspects described herein employ 3GPP terminology, it is to be understood that the aspects can also be applied to 3GPP technology (Release 99 [Rel99], Rel5, Rel6, Rel7), as well as 3GPP2 technology (1×RTT, 1×EV-DO Rel0, RevA, RevB) and other known and related technologies.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture", "module", or "apparatus" as used herein is intended to encompass, in at least one aspect, a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method of wireless communication for establishing packet connectivity for local packet data network (PDN) traffic, comprising:
   receiving, by a network entity, an electronic message comprising a request for a PDN connection;
   determining whether the request for the PDN connection is a local PDN request by at least comparing an access point name (an APN) associated with the request for the PDN connection to a list of local APN names;
   identifying a local gateway (L-GW) associated with the local PDN request by at least determining whether an Internet protocol (IP) address of the L-GW is indicated in the request, if the PDN connection is determined to be the local PDN request; and
   initiating a domain name server (DNS) query to obtain the IP address of the L-GW in response to detecting a failure in identifying the L-GW.

2. The method of claim 1, wherein obtaining the IP address of the L-GW further comprises extracting the IP address from a header of the electronic message.

3. The method of claim 1, wherein obtaining the IP address of the L-GW further comprises receiving the IP address in conjunction with the electronic message.

4. The method of claim 1, further comprising:
   performing the DNS query for the L-GW with a DNS server; and
   receiving the IP address of the L-GW from the DNS server.

5. The method of claim 4, further comprising:
   extracting a local APN from the local PDN request; and
   forming a fully qualified domain name from the local APN to facilitate performing the DNS query.

6. The method of claim 1, further comprising sending a session request message to the L-GW to establish the PDN connection with the L-GW.

7. The method of claim 6, wherein the session request message comprises a create default bearer request employed to establish the PDN connection.

8. The method of claim 1, wherein identifying the L-GW further comprises obtaining an IP address of a home base station coupled with the L-GW and employing the IP address of the home base station as the IP address of the L-GW.

9. An apparatus of a network entity configured to establish packet connectivity for local packet data network (PDN) traffic in conjunction with wireless communication, comprising:
   a communication interface for transmitting and receiving electronic communication; and
   memory for storing instructions configured to establish a network context for the local PDN traffic, the instructions being implemented by computer-executable modules, comprising:
      an analysis module that obtains a request for a PDN connection from the communication interface and determines whether the request is for the local PDN traffic by at least comparing an access point name (an APN) associated with the request for the PDN connection to a list of local APN names;
      an acquisition module that identifies a local gateway (L-GW) by at least determining whether an Internet protocol (IP) address of the L-GW is indicated in the request, wherein the L-GW supports the local PDN traffic and is associated with an entity originating the request; and
      a domain module that initiates a domain name server (DNS) query to obtain the IP address of the L-GW in response to detecting a failure in identifying the L-GW.

10. The apparatus of claim 9, further comprising a traffic setup module that instructs the L-GW to establish a packet context to support the local PDN traffic if the request is determined to be for the local PDN traffic.

11. The apparatus of claim 10, wherein the packet context is a PDN connection configured for the local PDN traffic, or a packet data protocol context (a PDP context) configured for the local PDN traffic.

12. The apparatus of claim 9, wherein the IP address is specified in an explicit information element of a wireless message that comprises the request.

13. The apparatus of claim 9, wherein the IP address is extracted from a source IP header of a wireless message that comprises the request.

14. The apparatus of claim 9, wherein the domain module:
   employs a defined local access point name (a defined local APN) specified with the request to form a fully qualified domain name (a FQDN);
   utilizes the FQDN to perform the DNS query; and
   obtains the IP address in response to the DNS query.

15. The apparatus of claim 9, wherein the analysis module determines that the request is for the local PDN traffic by at least one of:
   identifying whether the access point name (an APN) included with the request comprises a term specifically associated with the local PDN traffic; or identifying whether a second entity routing the request to the apparatus is a home base station, or a home base station gateway.

16. The apparatus of claim 9, wherein the apparatus comprises at least one of:
 a mobility management entity (an MME) of a long term evolution wireless network; or
 a serving GPRS support node (an S-GSN) of a universal mobile telecommunications system network.

17. An apparatus of a network entity configured for establishing a local packet data network (PDN) context in conjunction with a wireless communication, comprising:
 means for receiving an electronic message that comprises a request for a PDN connection;
 means for determining whether the request is a request to establish local PDN traffic by at least comparing an access point name (an APN) associated with the request for the PDN connection to a list of local APN names;
 means for identifying a local gateway (L-GW) for supporting the local PDN traffic by at least determining whether an Internet protocol (IP) address of the L-GW is indicated in the request, if the request is determined to be the request to establish the local PDN traffic; and
 means for initiating a domain name server (DNS) query to obtain the IP address of the L-GW in response to detecting a failure in identifying the L-GW.

18. At least one processor configured for establishing a local packet data network (PDN) context in conjunction with a wireless communication, comprising a plurality of modules of a network entity configured to:
 receive an electronic message that comprises a request for a PDN connection;
 determine whether the request is a request to establish local PDN traffic by at least comparing an access point name (an APN) associated with the request for the PDN connection to a list of local APN names;
 identify a local gateway (L-GW) for supporting the local PDN traffic by at least determining whether an Internet protocol (IP) address of the L-GW is indicated in the request, if the request is determined to be the request to establish the local PDN traffic; and
 initiate a domain name server (DNS) query to obtain the IP address of the L-GW in response to detecting a failure in identifying the L-GW.

19. A non-transitory computer-readable medium storing executable code, comprising:
 code for causing a computer of a network entity to receive an electronic message that comprises a request for a packet data network connection (a PDN connection);
 code for causing the computer to determine whether the request is a request to establish local packet data network (PDN) traffic by at least comparing an access point name (an APN) associated with the request for the PDN connection to a list of local APN names;
 code for causing the computer to identify a local gateway (L-GW) associated with the local PDN traffic by at least determining whether an Internet protocol (IP) address of the L-GW is indicated in the request, if the request is determined to be the request to establish the local PDN traffic; and
 code for causing the computer to initiate a domain name server (DNS) query to obtain the IP address of the L-GW in response to detecting a failure in identifying the L-GW.

* * * * *